US011453424B2

(12) United States Patent
Coats et al.

(10) Patent No.: US 11,453,424 B2
(45) Date of Patent: Sep. 27, 2022

(54) PARCEL CART

(71) Applicant: Material Handling Systems, Inc., Mt. Washington, KY (US)

(72) Inventors: Brandon Wayne Coats, Jeffersonville, IN (US); Jon Todd Fuchs, Louisville, KY (US); Nicholas Anderson Moore, Liberty Township, OH (US); Madhav Devidas Patil, Louisville, KY (US); Joshua Alan Wiley, Georgetown, IN (US); Kurt Michael Wittmer, Louisville, KY (US)

(73) Assignee: Material Handling Systems, Inc., Mt. Washington, KY (US)

( * ) Notice: Subject to any disclaimer, the term of this patent is extended or adjusted under 35 U.S.C. 154(b) by 286 days.

(21) Appl. No.: 16/804,310

(22) Filed: Feb. 28, 2020

(65) Prior Publication Data

US 2020/0276998 A1 Sep. 3, 2020

Related U.S. Application Data

(60) Provisional application No. 62/842,622, filed on May 3, 2019, provisional application No. 62/812,051, filed
(Continued)

(51) Int. Cl.
*B62B 3/02* (2006.01)
*B62B 3/00* (2006.01)
(Continued)

(52) U.S. Cl.
CPC .............. *B62B 3/02* (2013.01); *B62B 3/005* (2013.01); *B62B 5/0079* (2013.01); *B62B 5/04* (2013.01);
(Continued)

(58) Field of Classification Search
CPC ......... B62B 3/02; B62B 3/005; B62B 5/0079; B62B 2202/24; B62B 2203/07; B62B 2203/74; B62B 5/04
See application file for complete search history.

(56) References Cited

U.S. PATENT DOCUMENTS 4,787,808 A * 11/1988 Shimoji .................... B62B 3/04
414/536
11,148,697 B2 * 10/2021 Akamatsu ............. B62B 5/0079
(Continued)

FOREIGN PATENT DOCUMENTS

| JP | 2006-155039 A | 6/2006 |
|----|----|----|
| KR | 10-0527245 B1 | 11/2005 |
| KR | 20-2013-0003005 U | 5/2013 |

OTHER PUBLICATIONS

Korean Intellectual Property Office, International Search Report and Written Opinion issued in corresponding Application No. PCT/US2020/020360, dated Jun. 25, 2020.

*Primary Examiner* — John D Walters
(74) *Attorney, Agent, or Firm* — Stites & Harbison, PLLC; David W. Nagle, Jr.; Gary N. Stewart

(57) ABSTRACT

A parcel cart for transporting parcels comprises a substructure, with a frame mounted to and supported by the substructure. The frame defines an internal volume in which parcels are received and stored for transport. The frame also includes: a base; a first end wall; a second end wall; a first side wall; and a second side wall. To facilitate loading or unloading of the parcel cart, the frame can include at least one end wall configured to transition between an upright position and a lowered position. To facilitate autonomous transport of the parcel cart, the substructure and the frame can define a cavity for receiving a mobile robot. To avoid occlusion of the field of view of one or more cameras associated with the mobile robot, the frame can include at (Continued)

least one end wall that is in a non-perpendicular orientation relative to the base.

20 Claims, 12 Drawing Sheets

Related U.S. Application Data on Feb. 28, 2019, provisional application No. 62/812,022, filed on Feb. 28, 2019.

(51) Int. Cl.
*B62B 5/00* (2006.01)
*B62B 5/04* (2006.01)

(52) U.S. Cl.
CPC ....... *B62B 2202/24* (2013.01); *B62B 2203/07* (2013.01); *B62B 2203/74* (2013.01)

(56) References Cited

U.S. PATENT DOCUMENTS

2014/0369801 A1* 12/2014 Beauchamp .......... B62B 5/0003
 414/800
2017/0325445 A1* 11/2017 Mitchell ............. A01M 31/006

\* cited by examiner

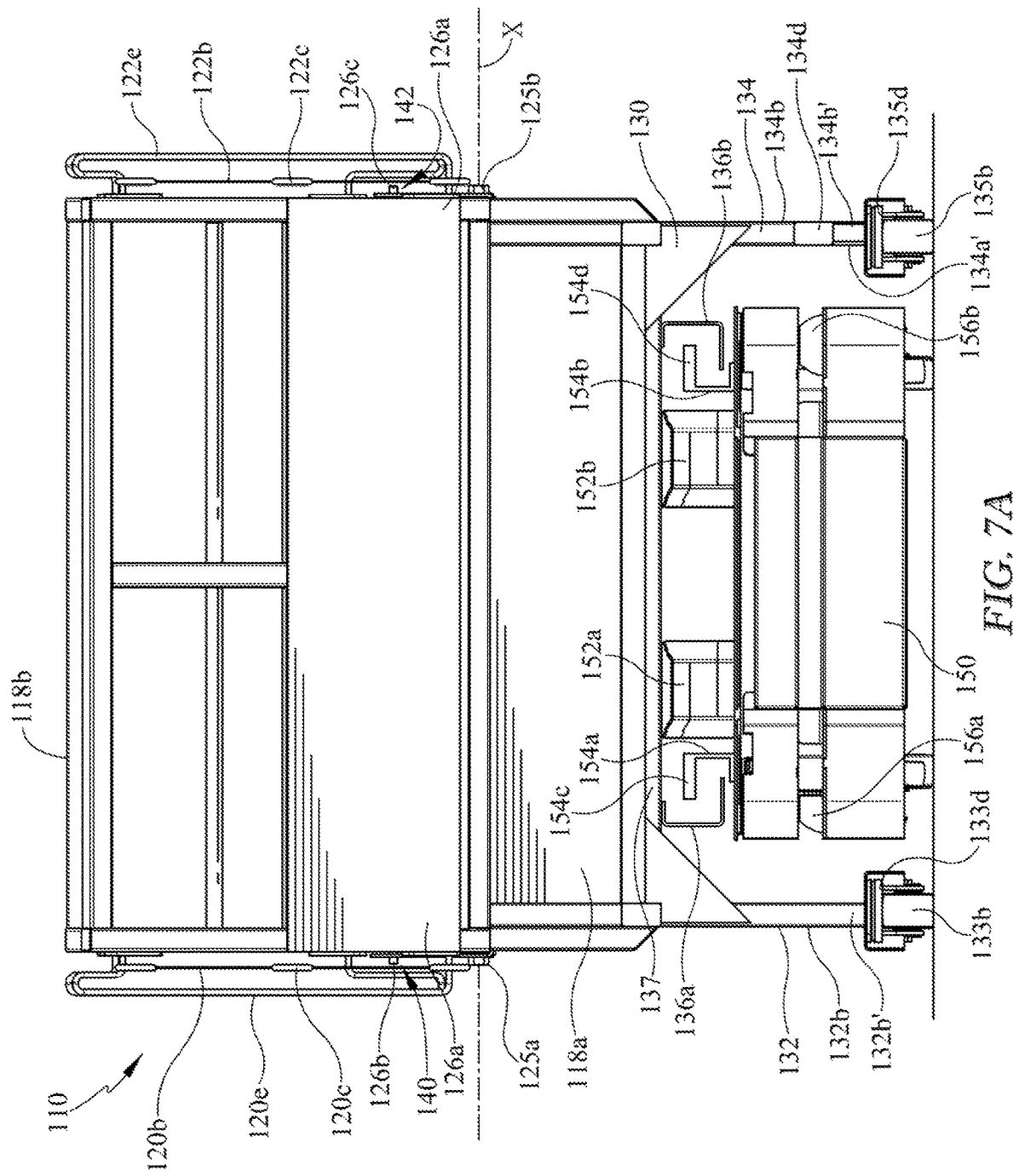

PARCEL CART

CROSS-REFERENCE TO RELATED APPLICATIONS

The present application claims priority to: U.S. Patent Application Ser. No. 62/812,051 filed on Feb. 28, 2019; U.S. Patent Application Ser. No. 62/812,022 filed on Feb. 28, 2019; and U.S. Patent Application Ser. No. 62/842,622 filed on May 3, 2019. The entire disclosures of each of these priority applications are incorporated herein by reference.

BACKGROUND OF THE INVENTION

The present invention relates to parcel carts that are useful for transporting parcels within a sorting or similar facility.

In a sorting facility for parcels, various parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the various parcels within the facility.

One item commonly used in sorting various parcels within the facility is a parcel cart configured to receive and transport several parcels at once. However, parcel carts of known construction are commonly designed such that individuals must manually deposit and withdraw parcels from the parcel cart. Accordingly, such parcel carts are not generally adapted to facilitate efficient offloading of parcels from a conveyor.

Moreover, the frequency in which parcel carts are autonomously driven from location to location within a sorting facility by a mobile robot, such as an automated guided vehicle, has increased in recent years. To navigate the parcel cart through the sorting facility, such mobile robots are commonly equipped with stereovision cameras (and/or similar sensors) on the front and back of the robot. These cameras are important to obstacle detection and automatic avoidance while the robot is in motion. However, many parcel carts of known construction have dimensions which either do not enable mobile robots to effectively engage them or include features which obstruct the cameras of the mobile robot.

SUMMARY OF THE INVENTION

The present invention is a parcel cart for transporting parcels.

A parcel cart for transporting parcels generally comprises a substructure, with a frame mounted to and supported by the substructure. The frame defines an internal volume in which parcels are received and stored for transport. To this end, the frame includes: a base; a first end wall extending upwardly from the base; a second end wall extending upwardly from the base; a first side wall extending between the first end wall and the second end wall; and a second side wall extending between the first end wall and the second end wall. To facilitate loading or unloading of the parcel cart, at least one of the end walls (or at least a portion thereof) is preferably configured to transition between an upright position and a lowered position.

In some embodiments, an upper portion of the second end wall is configured to transition between the upright position and the lowered position. In such embodiments, the frame may be characterized as including: a basket portion, which includes the base, the fixed portion of each end wall, the first side wall, and the second side wall; and a gate, which at least partially defines the second end wall, and which is mounted for rotation with respect to the basket portion about a substantially horizontal axis. To ensure the gate does not inadvertently fall from the upright position to the lowered position during transport of the parcel cart, the frame may include one or more locking mechanisms. In some embodiments, the gate is mounted to the basket portion of the frame, such that the gate can be moved in a radial direction relative to the substantially horizontal axis to transition the one or more locking mechanisms between a locked configuration and an unlocked configuration.

To further facilitate loading or unloading of the parcel cart, in some embodiments, an upper surface of the gate includes a roller deck, which includes multiple rollers configured to rotate to reduce the amount of force required to move a parcel across the upper surface of the gate and into or out of the interior of the parcel cart. In use, the gate can be lowered to a substantially horizontal orientation, and the parcel cart positioned so that parcels offloaded from a conveyor are transferred onto the roller deck to reduce or eliminate the need for human intervention in sorting applications requiring the offloading of parcels from a conveyor for subsequent transport. In other words, the gate is at a height that is substantially the same (or slightly less than) the height of the surface of the conveyor. To limit rotation of the gate about the axis, the basket portion can include one or more plates positioned below the gate. In some embodiments, the one or more plates may be positioned and extend, such that, when the gate is lowered onto the one or more plates, the gate is in the substantially horizontal orientation, thus helping to ensure the gate provides a level surface onto which parcels on a conveyor may be offloaded. In other embodiments, the gate may be configured to rotate beyond a substantially horizontal orientation, such as to a vertical orientation relative to an underlying ground surface.

In some embodiments, to permit adjustment of the exhibited height of one or more of the side walls of the frame, an upper portion of at least one of the side walls of the frame is comprised of a netting removably connected to the first end wall and the second end wall. In some embodiments, the upper portion of both the first side wall and the second side wall are each respectively comprised of a netting removably connected to the first end wall and the second end wall.

To facilitate autonomous transport of the parcel cart, in some embodiments, the substructure and the frame collectively define a cavity for receiving a mobile robot that is configured to engage (e.g., by lifting the parcel cart above an underlying ground surface) and transport the parcel cart to an intended destination. To assist the mobile robot in transporting the parcel cart to the intended destination, the mobile robot may include one or more stereovision cameras, which provide feedback regarding the presence of obstacles within the path of the mobile robot. To reduce or eliminate the extent to which one or more of the stereovision cameras associated with the mobile robot is occluded by the parcel cart, at least one of the end walls of the frame preferably extends upwardly at an angle relative to the base, such that at least one of the end walls is in a non-perpendicular orientation relative to the base. In some embodiments, both the first end wall and the second end wall are each in a non-perpendicular orientation relative to the base.

DESCRIPTION OF THE DRAWINGS

FIG. 7A is an end view of the exemplary parcel cart of FIG. 6A, with a mobile robot positioned below the parcel cart;

DETAILED DESCRIPTION OF THE INVENTION

The present invention is a parcel cart for transporting parcels. The parcel cart of the present invention can be combined with a mobile robot, such as an automated guided vehicle, to provide an improved system for transporting parcels.

Figure 1:
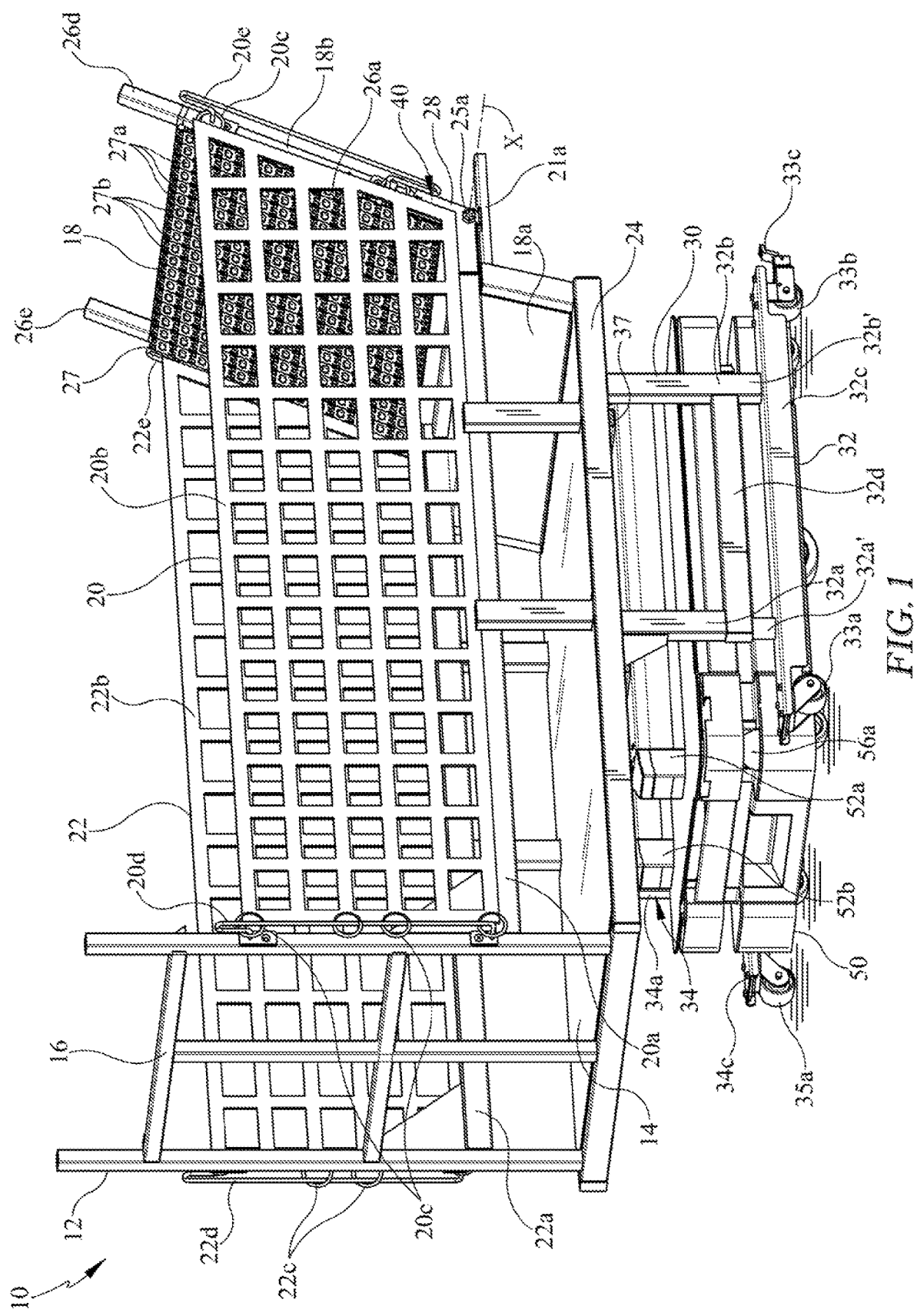
FIG. 1 is a perspective view of an exemplary parcel cart for transporting parcels made in accordance with the present invention, with a mobile robot positioned below the parcel cart.

FIG. 1 is a perspective view of an exemplary parcel cart 10 for transporting parcels made in accordance with the present invention, with a mobile robot 50 positioned below the parcel cart 10. The mobile robot 50 is configured to engage and transport the parcel cart 10 to an intended destination, and, as such, may be any automated guided vehicle suitable for such application. To assist the mobile robot 50 in locating and safely navigating the parcel cart 10 during transport, the mobile robot 50 preferably includes one or more stereovision cameras and/or a LIDAR detection system. For example, one suitable robot for transporting the exemplary parcel cart 10 is the MiR500 robot manufactured by Mobile Industrial Robots and available, for instance, from Air Hydro Power, Inc. of Louisville, Ky. Such a mobile robot 50 is further configured to engage the parcel cart 10 by lifting the parcel cart 10 above an underlying ground surface. To this end, the mobile robot 50 includes a first jack 52a and a second jack 52b, which can be engaged to lift the parcel cart 10 above an underlying ground surface during transport of the parcel cart 10 to an intended destination. After reaching the intended destination, the first jack 52a and the second jack 52b can be engaged to lower the parcel cart 10 and offload the parcel cart 10 onto an underlying ground surface. Once the parcel cart 10 is offloaded, the mobile robot 50 can travel to another loaded parcel cart in need of transport.

FIGS. 2, 3A-3B, and 4A-4B are various views of the exemplary parcel cart 10 of FIG. 1, and, in some cases, certain components of the parcel cart 10 have been hidden from view to better illustrate features of the parcel cart 10.

Referring now to FIGS. 1, 2, 3A-3B, and 4A-4B, the parcel cart 10 generally comprises a substructure 30, with a frame 12 mounted to and supported by the substructure 30. The frame 12 defines an internal volume in which parcels are received and stored for transport. To this end, in this exemplary embodiment, the frame 12 includes: a base 14; a first end wall 16 extending upwardly from the base 14; a second end wall 18 extending upwardly from the base 14; a first side wall 20 extending between the first end wall 16 and the second end wall 18; and a second side wall 22 extending between the first end wall 16 and the second end wall 18.

Referring still to FIGS. 1, 2, 3A-3B, and 4A-4B, the substructure 30 serves to support the frame 12 above an underlying ground surface, and, in this exemplary embodiment, includes one or more legs 32, 34 mounted to the base 14 of the frame 12. Specifically, in this exemplary embodiment, the substructure 30 includes two legs 32, 34: a first leg 32 and a second leg 34 mounted to opposite sides of the base 14. Each leg 32, 34 is defined by one or more vertical supports 32a, 32b, 34a, 34b and one or more horizontal supports 32c, 32d, 34c, 34d. More specifically in this exemplary embodiment, each leg 32, 34 is comprised of a first vertical support 32a, 34a and a second vertical support 32b, 34b interconnected by a first horizontal support 32c, 34c and a second horizontal support 32d, 34d.

Figure 8:
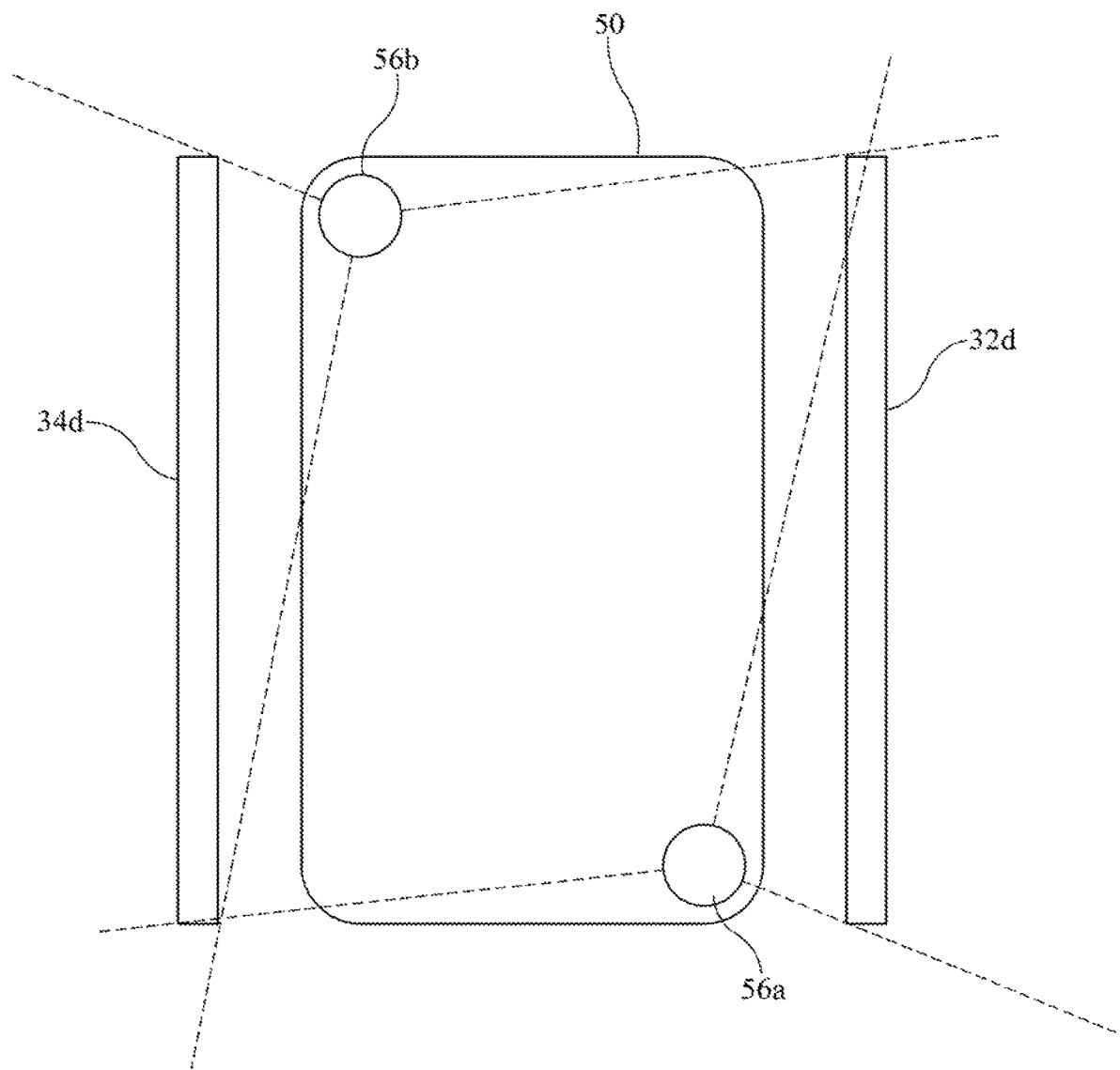
FIG. 8 is a schematic view that illustrates the interaction of the sensors of a LIDAR system of the mobile robot of FIG. 1 with the exemplary parcel cart of FIG. 1.

To assist the mobile robot 50 (shown in FIG. 1) in locating the parcel cart 10, the second horizontal support 32d, 34d of each leg 32, 34 is preferably positioned to fall within the field of view of one or more sensors of a LIDAR system of the mobile robot 50 when the parcel cart 10 is positioned on a ground surface. FIG. 8 is a schematic view that illustrates the interaction of the sensors 56a, 56b of a LIDAR system of the mobile robot 50 with the respective horizontal supports 32d, 34d. Such use of the second horizontal supports 32d, 34d of each leg 32, 34 increases docking accuracy and minimizes failed docking attempts.

Furthermore, in this exemplary embodiment, the substructure 30 includes one or more support members 37 extending between the first leg 32 and the second leg 34 (shown in FIG. 1). In some embodiments, the one or more support members 37 may serve as a connection point for one or more guide rails, such as those described below with reference to FIGS. 5, 6A-6B, and 7A-7B, which may assist in centrally aligning the mobile robot 50 below the parcel cart 10.

Referring still to FIGS. 1, 2, 3A-3B, and 4A-4B, to facilitate manual repositioning of the parcel cart 10, each leg 32, 34 of the substructure 30 preferably includes one or more wheels (or casters) 33a, 33b, 35a, 35b. In this exemplary embodiment, the substructure 30 includes a first pair of wheels 33a, 33b connected to the first horizontal support 32c of the first leg 32 and a second pair of wheels 35a, 35b connected to the first horizontal support 34c of the second leg 34. To maintain the positioning of the parcel cart 10 and prevent undesired movement thereof, one or more of the wheels 33a, 33b, 35a, 35b may be provided with a locking mechanism that can be selectively engaged to prevent rotation of the wheel 33a, 33b, 35a, 35b. In this exemplary embodiment, a single wheel 33b within the first pair of wheels 33a, 33b is provided with a locking mechanism 33c, and a single wheel 35b within the second pair of wheels 35a, 35b is provided with a locking mechanism 35c.

Figure 2:
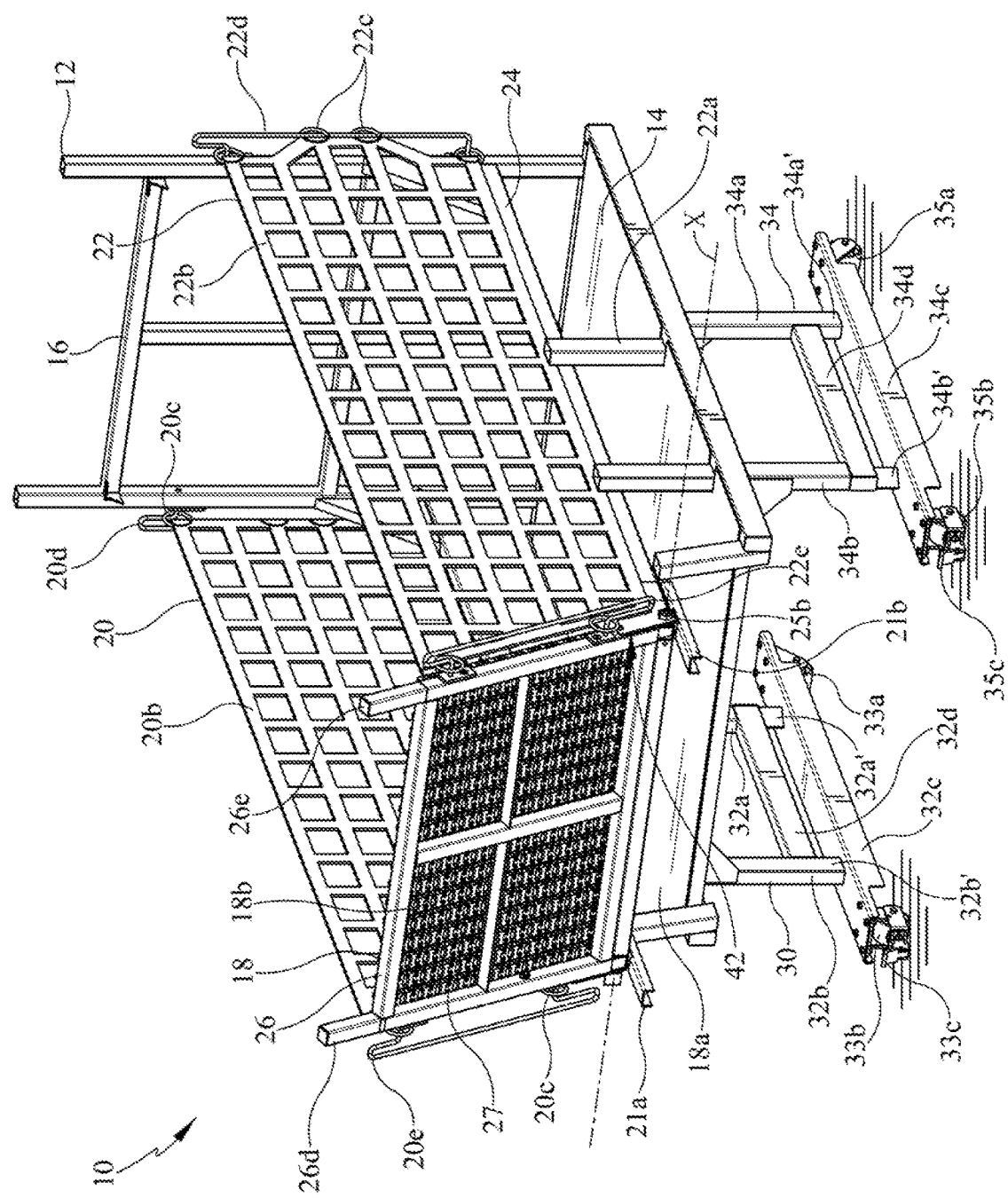
FIG. 2 is an alternate perspective view of the exemplary parcel cart of FIG. 1.
Figure 3A:
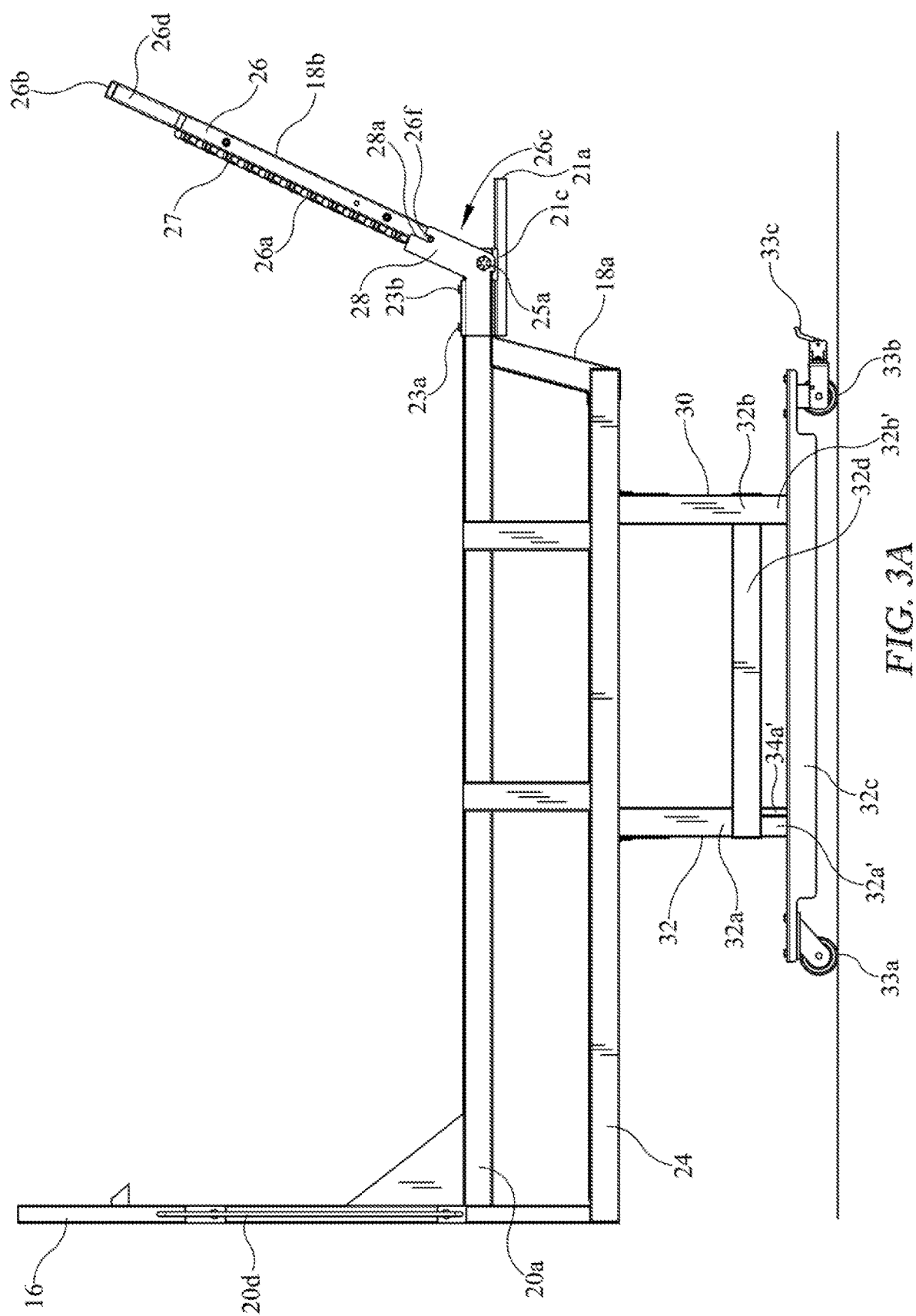
FIG. 3A is a side view of the exemplary parcel cart of FIG. 1, with certain components hidden from view for clarity.
Figure 3B:
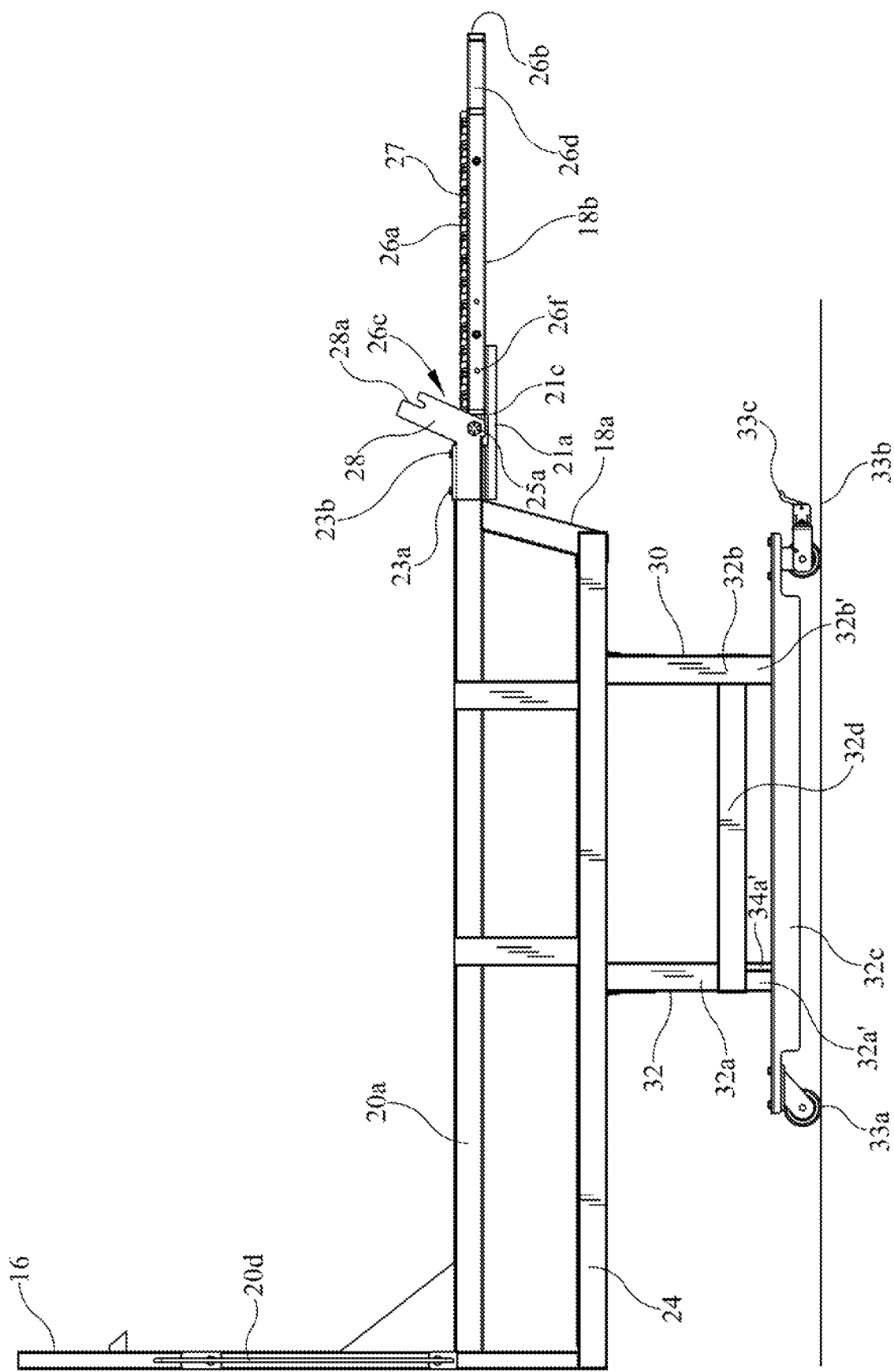
FIG. 3B is another side view of the exemplary parcel cart of FIG. 1, similar to that of FIG. 3A, but with one of the end walls in a lowered position.
Figure 4A:
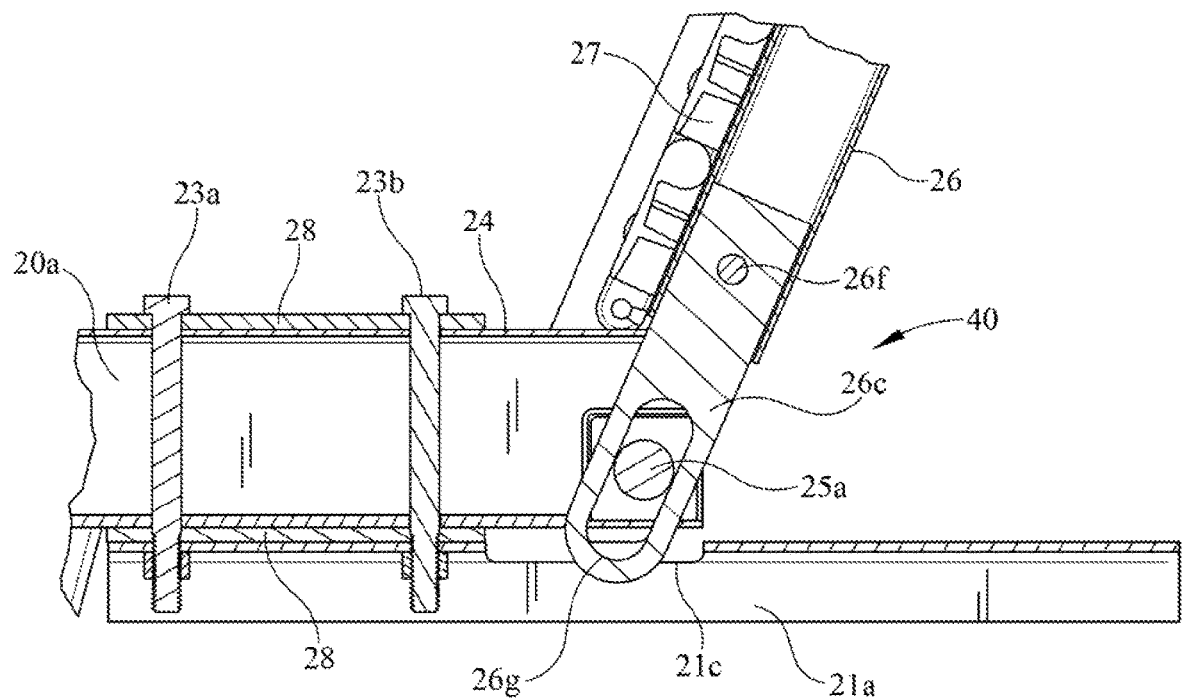
FIG. 4A is an enlarged partial sectional view of the exemplary parcel cart of FIG. 1.
Figure 4B:
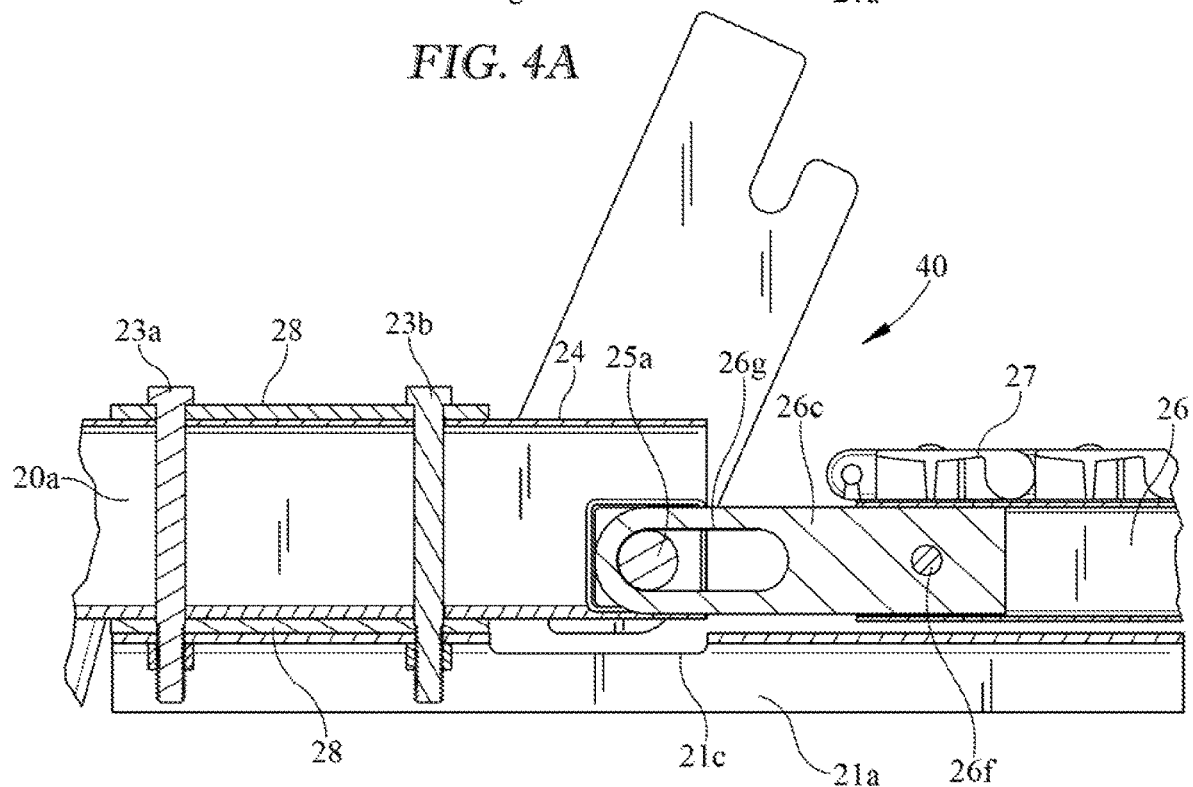
FIG. 4B is an enlarged partial sectional view of the exemplary parcel cart of FIG. 1.

Referring still to FIGS. 1, 2, 3A-3B, and 4A-4B, to facilitate loading or unloading of the parcel cart 10, at least one end wall 16, 18 (or at least a portion thereof) is configured to transition between an upright position (as shown in FIGS. 1, 2, 3A, and 4A) and a lowered position (as shown in FIGS. 3B and 4B). In this exemplary embodiment, an upper portion 18b of the second end wall 18 is configured to transition between the upright position and the lowered position. In this regard, the frame 12 can alternatively be characterized as including: a basket portion 24; and a gate 26 that is mounted for rotation with respect to the basket portion 24 about a substantially horizontal axis, X. Thus, in this exemplary embodiment, the basket portion 24 is defined by the base 14, the first end wall 16, a lower portion 18a of the second end wall 18, the first side wall 20, and the second side wall 22. The gate 26 is thus the upper portion 18b of the second end wall 18 in the description of the exemplary embodiment that follows. In other words, a portion of the basket portion 24 (i.e., the lower portion 18a of the second end wall 18) and the gate 26 (i.e., the upper portion 18b of the second end wall 18) collectively define the second end wall 18.

As best shown in FIGS. 3A-3B and 4A-4B, in this exemplary embodiment, when the gate 26 is lowered (as shown in FIGS. 3B and 4B), thus placing the second end wall 18 in the lowered position, the height of the second end wall 18 is reduced from that exhibited when the gate 26 is raised and the second end wall 18 is in the upright position (as shown in FIGS. 3A and 4A). Thus, by lowering the gate 26, the extent to which a parcel must be lifted for insertion into the interior of the parcel cart 10 is reduced. Indeed, placing the second end wall 18 in the lowered position may serve to reduce or eliminate the need for human intervention in certain sorting applications, as further described below.

Referring still to FIGS. 3A-3B and 4A-4B, in this exemplary embodiment, the gate 26 is mounted for rotation with respect to the basket portion 24 of the frame 12 by a first pin 25a and a second pin 25b, which are aligned along the substantially horizontal axis, X. Of course, alternative fastening means suitable for mounting the gate 26 to the basket portion 24 and permitting rotation thereof about the axis, X, may be used without altering the operating principle.

Referring now again to FIGS. 1, 2, 3A-3B, and 4A-4B, in this exemplary embodiment, the first side wall 20 and the second side wall 22 are each comprised, respectively, of a lower portion 20a, 22a and an upper portion 20b, 22b. The lower portion 20a, 22a of each side wall 20, 22 is defined, respectively, by a series of rigid (metal) vertical supports interconnected by a single rigid (metal) horizontal support. The vertical supports and horizontal support defining the respective lower portions 20a, 22a of the first and second side walls 20, 22 are combined in a manner which causes the lower portion 20a, 22a of both the first side wall 20 and the second side wall 22 to define a plurality of openings. Preferably, the openings defined by the lower portion 20a, 22a of the first side wall 20 and the second side wall 22 are such that parcels loaded into the parcel cart 10 cannot pass entirely therethrough. In this regard, the arrangement or number of vertical and horizontal supports defining the lower portion 20a, 22a of the first side wall 20 and the second side wall 22 can be adjusted at the time of manufacture so that such openings are of suitable dimension for an intended application. In alternative embodiments, the respective lower portions 20a, 22a of the first side wall 20 and the second side wall 22 may each be enclosed so that no openings are defined therethrough.

Like the lower portions 20a, 22a of the first and second side walls 20, 22, in this exemplary embodiment, the first end wall 16 is also defined by rigid (metal) vertical supports and horizontal supports, which are interconnected as to define a plurality of openings. Moreover, like the lower portions 20a, 22a of the first and second side wall 20, 22, the arrangement and number of vertical and horizontal supports of the first end wall 16 can be adjusted at the time of manufacture so that the openings are of suitable dimension for an intended application. However, in this exemplary embodiment, the second end wall 18 includes no such openings. Rather, the lower portion 18a of the second end wall 18 includes a rigid (metal) panel attached to and extending from the first side wall 20 to the second side wall 22, while the upper portion 118b of the second end wall 18b is defined by the gate 26 (and attached roller deck 27), as further described below.

Referring now to FIGS. 1 and 2, in this exemplary embodiment, the upper portion 20b of the first side wall 20 and the upper portion 22b of the second side wall 22 are both comprised of a netting, such as a polyester or nylon net. Such netting increases the usability and ergonomics of the parcel cart 10 as it is loaded and unloaded by allowing more natural posture and reach by the interfacing operator—whether human or robotic. The netting of the upper portion 20b of the first side wall 20 is attached to the first end wall 16 and the upper portion 18b of the second end wall 18 via a first plurality of connectors 20c. Similarly, the netting of the upper portion 22b of the second side wall 22 is attached to the first end wall 16 and the upper portion 18b of the second end wall 18 via a second plurality of connectors 22c. In this exemplary embodiment, the first plurality and second plurality of connectors 20c, 22c are each comprised of multiple rings, integrated into the edge of the netting; of course, other fasteners suitable for connecting the netting to the respective first and second end walls 16, 18 may be used.

As a further refinement, the upper portion 20b, 22b of each side wall 20, 22 can be selectively attached or detached to the first end wall 16 and the upper portion 18b of the second end wall 18 to adjust the height of the side wall 20, 22. As shown in FIGS. 3A and 3B, when the upper portion 20b, 22b of each side wall 20, 22 is detached, each side wall 20, 22 exhibits a first height which reduces the extent to which a parcel must be lifted for insertion into the interior of the parcel cart 10. Conversely, and as shown in FIGS. 1 and 2, when the upper portion 20b, 22b of each side wall 20, 22 is attached, each side wall 20, 22 exhibits a second height that is greater than the first height which serves to ensure parcels do not spill over the top of the side walls 20, 22 during transport of the parcel cart 10.

Referring again to FIGS. 1 and 2, to reduce the time required to adjust the height of the first side wall 20 and the second side wall 22, in this exemplary embodiment, each of the first and second end walls 16, 18 has a pair of guide rods 20d, 20e, 22d, 22e attached thereto to which the connectors 20c, 22c associated with the first side wall 20 and the second side wall 22 can be slidably connected. Specifically, the first side wall 20 has a first guide rod 20d and a second guide rod 22d attached to its opposing sides to which the connectors 20c on one end of the first side wall 20 and the connectors 22c on one end of the second side wall 22 can, respectively, be slidably connected. Similarly, the upper portion 18b of the second end wall 18, has a third guide rod 20e and a fourth guide rod 22e attached to its opposing sides to which the connectors 20c on the opposing end of the first side wall 20 and the connectors 22c on the opposing end of the second side wall 22 can, respectively, be slidably connected. Each guide rod 20d, 20e, 22d, 22e is designed such that connectors 20c, 22c connected thereto can be repositioned along the guide rod 20d, 20e, 22d, 22e to increase or decrease the height of the side walls 20, 22 to which they correspond without having to detach the upper portion 20b, 22b of the side walls 20, 22 from the respective first and second end walls 16, 18.

Referring now again to FIGS. 1, 2, 3A-3B, and 4A-4B, to further facilitate loading or unloading of the parcel cart 10, in this exemplary embodiment, the upper surface 26a of the gate 26 includes a roller deck 27. The roller deck 27 is comprised of multiple rollers 27a, which are positioned at spaced intervals from one another and are configured to rotate to reduce the amount of force required to move a parcel across the upper surface 26a of the gate 26 and into or out of the interior of the parcel cart 10. In this exemplary embodiment, the roller deck 27 is comprised of multiple tiles 27b, which are linked together and each carry a respective one of the multiple rollers 27a (such as a ball roller). In this regard, each roller 27a can rotate independently of the other rollers 27a within the roller deck 27. Furthermore, in this exemplary embodiment, each roller 27a is a multi-directional roller configured to rotate at least in a first direction (e.g., towards the interior of the parcel cart 10) and a second direction that is opposite of the first direction (e.g., away from the interior of the parcel cart 10). Of course, roller decks of different designs or configurations, but which nonetheless serve to reduce the amount of force required to move a parcel across the upper surface 26a of the gate 26 and into or out of the interior of the parcel cart 10 may alternatively be used.

In use, the gate 26 can be transitioned from the upright position to the lowered position, in which the roller deck 27 is in a substantially horizontal orientation, such as that shown in FIGS. 3B and 4B. At that time, the parcel cart 10 is preferably positioned so that a distal end 26b of the gate 26 is positioned proximate to an offloading end of a conveyor (not shown) carrying parcels, such that parcels offloaded from the conveyor can be transferred onto the roller deck 27. In other words, the gate 26 is at a height that is substantially the same (or slightly less than) the height of the surface of the conveyor. In this exemplary embodiment, the gate 26 further includes two alignment arms 26d, 26e between which the offloading end of the conveyor can be positioned or with which the offloading end of the conveyor can interlock to ensure proper alignment of the conveyor and roller deck 27. Rollers 27a coming in contact with an offloaded parcel are driven in response to the momentum carried by the parcel as it is offloaded from the conveyor. Depending upon the speed of the conveyor, the momentum carried by the parcel may be sufficient to carry the parcel entirely across the roller deck 27 and into the interior of the parcel cart 10. However, even if the momentum of the offloaded parcel is insufficient to travel entirely across the roller deck 27, other parcels subsequently offloaded from the conveyor will advance the initial offloaded parcel across the roller deck 27. In this way, the parcel cart 10 can be utilized to reduce or eliminate the need for human intervention in sorting applications requiring the offloading of parcels from a conveyor for subsequent transport. Of course, the parcel cart 10 is also suitable for use in other automated loading or offloading applications, or even for manual loading or offloading applications.

Referring still to FIGS. 1, 2, 3A-3B, and 4A-4B, after a certain volume of parcels has been loaded into the interior of the parcel cart 10, the gate 26 can be transitioned back to the upright position, thus establishing a heightened barrier which serves to prevent loaded parcels from inadvertently exiting the interior of the parcel cart 10 during transport. To ensure the gate 26 does not inadvertently fall to the lowered position during transport, the frame 12 preferably includes one or more locking mechanisms. In this exemplary embodiment, the parcel cart 10 includes two identical locking mechanisms: a first locking mechanism 40 and a second locking mechanism 42, with each locking mechanism 40, 42 configured to hold the gate 26 in the upright position. Moreover, in this exemplary embodiment, each locking mechanism 40, 42 is comprised of a component of the basket portion 24 and a component of the gate 26 configured to associate and disassociate with one another to transition each locking mechanism 40, 42 between a locked configuration and an unlocked configuration.

Referring now to FIGS. 3A and 3B, in this exemplary embodiment, the first locking mechanism 40 includes a slot 28a defined by the basket portion 24 and a locking arm 26f extending outwardly from the proximal end 26c of the gate 26, which is oriented substantially parallel to the first pin 25 about which the gate 26 rotates. The basket portion 24 includes a first bracket 28, which is mounted to the lower portion 20a of the first side wall 20 via one or more fasteners 23a, 23b (e.g., bolts), and which defines the slot 28a of the first locking mechanism 40.

Referring now to FIGS. 3A, 3B, 4A, and 4B, the gate 26 can be maintained in the upright position by placing the locking mechanism 40 in the locked configuration. To place the locking mechanism 40 in the locked configuration, the locking arm 26f of the locking mechanism 40 is lowered into a seated position within the slot 28a defined by the bracket 28. Conversely, to transition the gate 26 to the lowered position, the locking mechanism 40 must be transitioned to the unlocked configuration, which is achieved by lifting the gate 26 so that the locking arm 26f of the locking mechanism 40 is no longer positioned within the slot 28a defined by the bracket 28

FIGS. 4A and 4B, in sequence, show the gate 26 being transitioned from the upright position to the lowered position. As shown in FIGS. 4A and 4B, to lift the locking arm 26f of the locking mechanism 40 into and out of the slot 28a (not shown in FIGS. 4A and 4B), the gate 26 is mounted to the basket portion 24, such that the gate 26 can be moved in a radial direction relative to the axis, X, about which it is configured to rotate. To this end, the proximal end 26c of the gate 26 defines an elongated slot 26g through which the first pin 25a extends to mount the gate 26 to the basket portion 24.

Referring now again to FIGS. 3A, 3B, 4A, and 4B, as the gate 26 is lifted to transition the locking mechanism 40 from the locked configuration to the unlocked configuration, the elongated slot 26g facilitates such movement. When the gate 26 is in the upright position in FIGS. 3A and 4A, the pin 25a is positioned at an intermediate portion of the elongated slot 26g. When the gate 26 is in the lowered position in FIGS. 4A and 4B, the pin 25a is positioned at a distal end of the elongated slot 26g. In short, the elongated slot 26g allows for the requisite movement of the gate 26 related to the basket portion 24 to transition the locking mechanism 40 between the locked configuration and the unlocked configuration Of course, the second locking mechanism 42 operates in the same manner and includes the same features as the first locking mechanism 40 on the opposite side of the parcel cart 10.

Referring again to FIGS. 1, 2, 3A-3B, and 4A-4B, in this exemplary embodiment, the basket portion 24 further includes one or more plates 21a, 21b positioned below the gate 26, which serve to limit rotation of the gate 26 about the axis, X. In this exemplary embodiment, the basket portion 24 includes two plates 21a, 21b: a first plate 21a and a second plate 21b. Moreover, in this exemplary embodiment, the first plate 21a is mounted to the first side wall 20 beneath the first bracket 28 using the same fasteners 23a, 23b that are used to mount the first bracket 28, and the second plate 21b is mounted to the second side wall 22 in a similar manner. The first plate 21a and the second plate 21b each extend outwardly to define a shelf on which the gate 26 can rest when placed in the lowered position, as shown in FIGS. 3B and 4B. As further shown in FIGS. 3B and 4B, in this exemplary embodiment, the first plate 21a and the second plate 21b are positioned and extend, such that, when the gate 26 is lowered to rest on the first plate 21a and the second plate 21b, the gate 26 is in a substantially horizontal orientation. In this way, the first plate 21a and the second plate 21b can help to ensure that the gate 26 (and the roller deck 27) provide a level surface onto which parcels on a conveyor may be offloaded when the gate 26 is placed in the lowered position.

Referring now again to FIGS. 3A, 3B, 4A, and 4B, in this exemplary embodiment, the first plate 21a defines an opening 21c through which a portion of the proximal end 26c of the gate 26 extends when the gate 26 is in the upright position. Permitting a portion of the proximal end 26c of the gate 26 to extend through the first plate 21a when in the upright position, enables the first pin 25a to be positioned closer to the first plate 21a. In this way, the opening 21c defined by the first plate 21a reduces the space between the gate 26 and an upper surface of the first plate 21a when the gate 26 is in the lowered position, thus reducing any unintended movement of the gate 26 as parcels are loaded onto and travel over the gate 26.

Of course, the second plate 21b has the same features and function as the first plate 21a.

As a further refinement, although not shown in FIGS. 1, 2, 3A-3B, and 4A-4B, the parcel cart 10 may be provided with a counterweight or counterbalancing system to assist in transitioning the gate 26 between the upright position and the lowered position, Referring again to FIGS. 1, 2, 3A-3B, and 4A-4B, along with the schematic view of FIG. 8, the base 14 of the frame 12 and the substructure 30 of the parcel cart 10 collectively define a cavity in which a mobile robot 50 can be received. In this exemplary embodiment, such cavity is defined by the base 14, the first leg 32, the second leg 34, and the one or more support members 37 extending between the first leg 32 and the second leg 34. Within the cavity, the parcel cart 10 preferably include features to facilitate the physical coupling of the parcel cart 10 to the mobile robot 50 for safe and reliable transport. As mentioned above, in this exemplary embodiment, the mobile robot 50 can engage the parcel cart 10 by simultaneously engaging the first jack 52a and the second jack 52b to lift the parcel cart 10, and subsequently transport the parcel cart 10 to an intended destination. As the parcel cart is lifted above the ground surface, the second horizontal support 32d, 34d of each leg 32, 34 of the substructure 30 is lifted out of the field of view of the sensors 56a, 56b of the LIDAR system of the mobile robot 50.

Furthermore, depending on the extent to which the first jack 52a and the second jack 52b are configured to lift the parcel cart 10 above the underlying ground surface, one or more portions of each leg 32, 34 located below the second horizontal support 32d, 34d may still fall within the field of view of the sensors 56a, 56b of the LIDAR system of the mobile robot 50. To reduce the extent to which the field of view of the respective sensors 56a, 56b are occluded by such portions of each leg 32, 34, the first leg 32 and the second leg are 34 each preferably positioned below the frame 12, such that, when the mobile robot 50 is centrally positioned below the parcel cart 10, neither the first leg 32 nor the second leg 34 is positioned adjacent to the front or back end of the mobile robot. In other words, the first leg 32 and the second leg 34 are each positioned adjacent to a mid-portion of the mobile robot 50.

Additionally, in this exemplary embodiment, it is possible that a lower portion 32a', 32b', 34a', 34b' of the first vertical support 32a, 34a and the second vertical support 32b, 34b of each leg 32, 34 located between the first horizontal support 32c, 34c and the second horizontal support 32d, 34d may fall within the field of view of one of the sensors 56a, 56b when the parcel cart 10 is lifted. Accordingly, in this exemplary embodiment, the lower portions 32a', 34b' of the vertical supports 32a, 34b are shaped to minimize the extent to which such lower portions 32a', 34b' occlude the sensors 56a, 56b of the LIDAR system. Specifically, since the lower portions 32a', 34b' of the vertical support 32a, 34b are positioned proximate to the sensors 56a, 56b, these lower portions 32a', 34b' are constructed of a thin plate rotated toward the cavity defined by the substructure 30 and frame 12 of the parcel cart 10. At the same time, the lower portions 32b', 34a' of each of the vertical supports 32b, 34a positioned distal from the sensors 56a, 56b are of the same tubular construction as the remaining portions of the vertical support 32b, 34a. Because of their distance away from the respective sensors 56a, 56b, the shape of the lower portions 32b', 34a' of the vertical supports 32b, 34a is not as critical.

Figure 9:
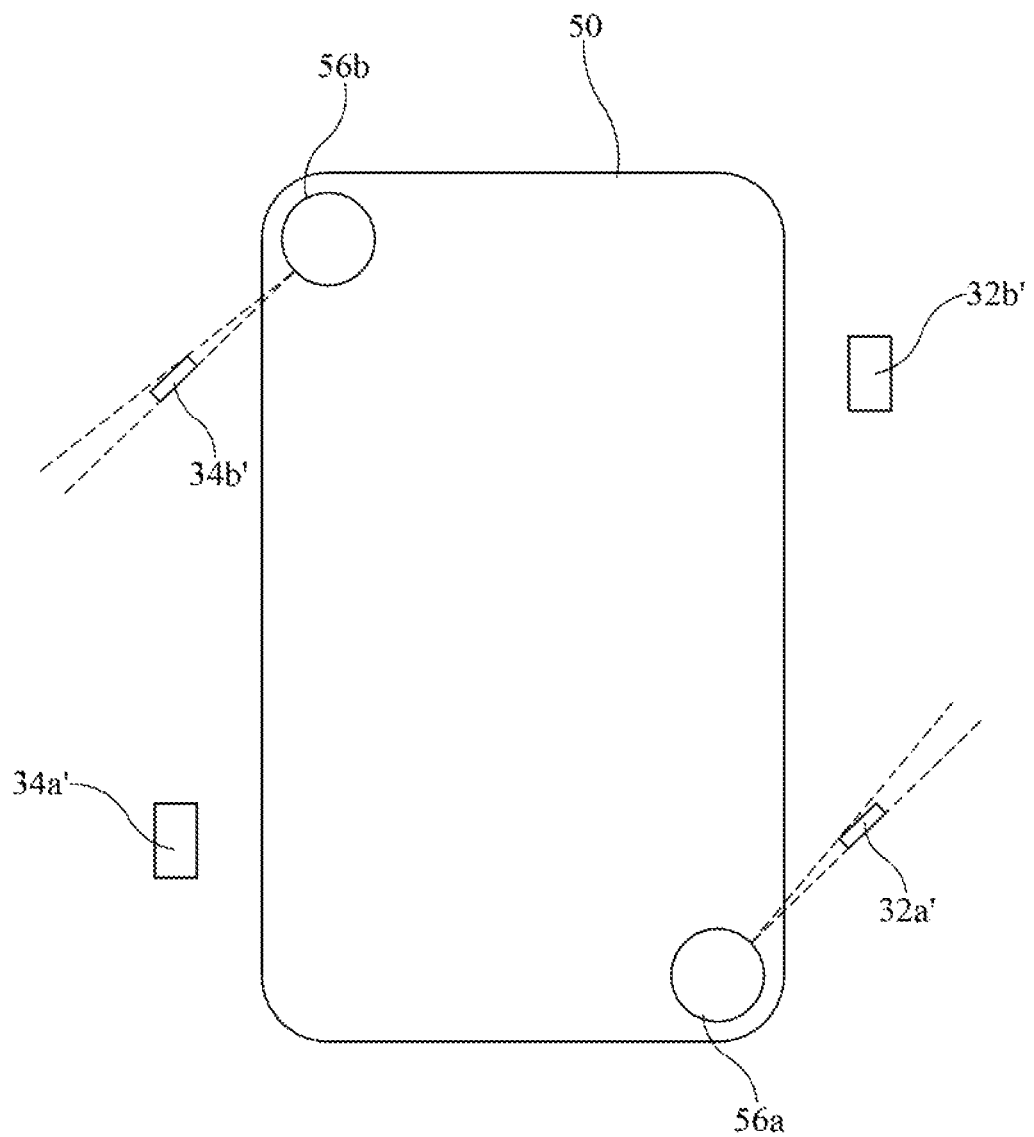
FIG. 9 is another schematic view that illustrates the interaction of the sensors of a LIDAR system of the mobile robot of FIG. 1 with the exemplary parcel cart of FIG. 1.

FIG. 9 is a schematic view that illustrates, when the parcel cart 10 is lifted, the interaction of the sensors 56a, 56b of a LIDAR system of the mobile robot 50 with the respective lower portions 32a', 34b' of the vertical support 32a, 34b positioned proximate to the sensors 56a, 56b, which minimizes shadows, and the respective lower portions 32b', 34a' of the vertical support 32a, 34b positioned distal from the sensors 56a, 56b.

With the parcel cart 10 lifted and the sensors 56a, 56b of the LIDAR system either unobstructed or minimally obstructed, the LIDAR system of the mobile robot 50 can thus effectively assist in navigating the mobile robot 50, and thus the parcel cart 10, to the intended destination.

To assist the mobile robot 50 in transporting the parcel cart 10 to the intended destination, the mobile robot 50 may include one or more stereovision cameras (not shown), which provide feedback regarding the presence of obstacles within the path of the mobile robot 50. Stereovision cameras employed for such application can have a field of view which extends from the ground surface on which the mobile robot 50 is positioned to several feet above the ground surface. To accommodate such field of view and reduce or eliminate the extent to which one or more of the stereovision cameras associated with the mobile robot 50 is occluded by the parcel cart 10, at least one of the end walls 16, 18 of the frame 12 extends upwardly at an angle relative to the base 14 (i.e., at least one of the end walls 16, 18 is in a non-perpendicular orientation relative to the base 14 of the frame 12). In this exemplary embodiment, the second end wall 18 extends upwardly from the base 14 at an angle, such that the second end wall 18 is not perpendicular to the base 14. Such orientation of the second end wall 18 thus prevents or reduces the occlusion of any stereovision cameras associated with the mobile robot 50 having a field of view proximal to the second end wall 18. Conversely, in this exemplary embodiment, the first end wall 16 extends perpendicularly to the base 14 of the frame 12 to maximize the overall loading capacity of the parcel cart 10. When the parcel cart 10 is loaded, the increased loading capacity toward the first end wall 16 within the internal volume of the parcel cart 10 can serve to shift the center of gravity of the parcel cart 10, which improves the stability of the parcel cart 10 in instances where the mobile robot 50 brakes abruptly. Specifically, there is more volume for receiving parcels near the first end wall 16, i.e., to the rear of the parcel cart 10. Thus, when loaded, the center of gravity of the loaded parcel cart 10 is effectively behind that of the mobile robot 50. During braking events, movement of the parcels within the parcel cart 10 can shift its center of gravity forward, moving it toward the center of gravity of the mobile robot 50, but not ahead of the center of gravity of the mobile robot 50. This increases stability and substantially reduces skidding or other undesirable movement during braking events.

Figure 5:
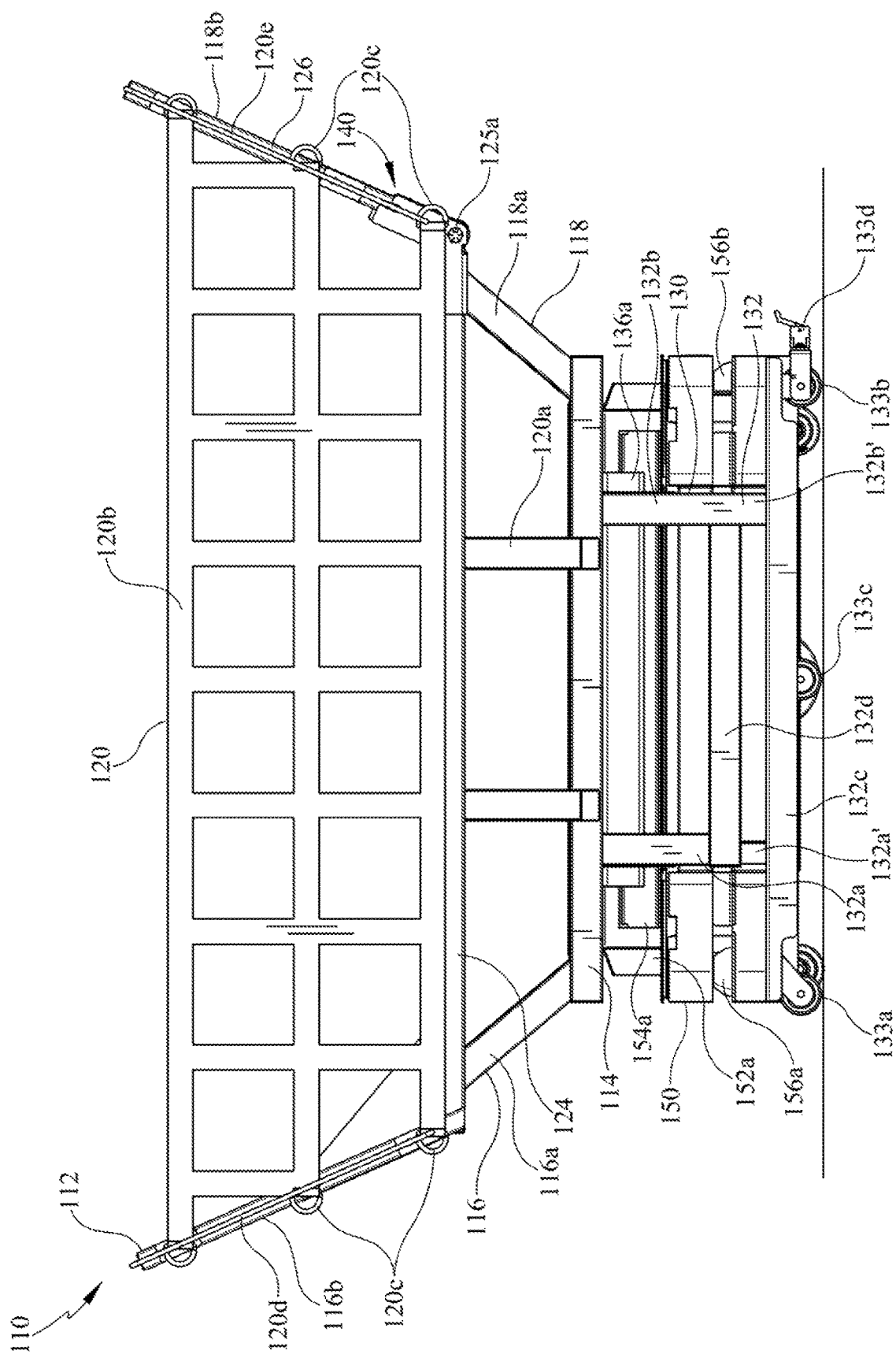
FIG. 5 is a side view of another exemplary parcel cart made in accordance with the present invention, with a mobile robot positioned below the parcel cart.

FIG. 5 is a side view of another exemplary parcel cart 110 for transporting parcels made in accordance with the present invention, with a mobile robot 150 positioned below the parcel cart 110. The mobile robot 150 is configured to engage and transport the parcel cart 110 to an intended destination, and, as such, may be any automated guided vehicle suitable for such application. To assist the mobile robot 150 in locating and safely navigating the parcel cart 110 during transport, the mobile robot 150 preferably includes one or more stereovision cameras and/or a LIDAR detection system. For example, one suitable robot for transporting the exemplary parcel cart 110 is the MiR500 robot manufactured by Mobile Industrial Robots and available, for instance, from Air Hydro Power, Inc. of Louisville, Ky. Such a mobile robot 150 is further configured to engage the parcel cart 110 by lifting the parcel cart 110 above an underlying ground surface. To this end, the mobile robot 150 includes a first jack 152a and a second jack 152b (though only the first jack 152a is shown in FIG. 5), which can be engaged to lift the parcel cart 110 above an underlying ground surface during transport of the parcel cart 110 to an intended destination, as further described below with reference to FIGS. 7A and 7B. After reaching the intended destination, the first jack 152a and the second jack 152b can be engaged to lower the parcel cart 110 and offload the parcel cart 110 onto an underlying ground surface. Once the parcel cart 110 is offloaded, the mobile robot 150 can travel to another loaded parcel cart in need of transport.

FIGS. 6A-6B and 7A-7B are various views of the exemplary parcel cart 110 of FIG. 5.

Referring now to FIGS. 5, 6A-6B, and 7A-7B, the parcel cart 110 generally comprises a substructure 130, with a frame 112 mounted to and supported by the substructure 130. The frame 112 defines an internal volume in which parcels are received and stored for transport. To this end, in this exemplary embodiment, the frame 112 includes: a base 114; a first end wall 116 extending upwardly from the base 114; a second end wall 118 extending upwardly from the base 114; a first side wall 120 extending between the first end wall 116 and the second end wall 118; and a second side wall 122 extending between the first end wall 116 and the second end wall 118.

Referring still to FIGS. 5, 6A-6B, and 7A-7B, the substructure 130 serves to support the frame 112 above an underlying ground surface, and, in this exemplary embodiment, includes one or more legs 132, 134 mounted to the base 114 of the frame 112. Specifically, in this exemplary embodiment, the substructure 130 includes two legs 132, 134: a first leg 132 and a second leg 134 mounted to opposite sides of the base 114. In this exemplary embodiment, each leg 132, 134 is defined by one or more vertical supports 132a, 132b, 134a, 134b and one or more horizontal supports 132c, 132d, 134c, 134d. More specifically in this exemplary embodiment, each leg 132, 134 is comprised of a first vertical support 132a, 134a and a second vertical support 132b, 134b interconnected by a first horizontal support 132c, 134c and a second horizontal support 132d, 134d.

To assist the mobile robot 150 in locating the parcel cart 110, the second horizontal support 132d, 134d of each leg 132, 134 is preferably positioned to fall within the field of view of one or more sensors 156a, 156b of a LIDAR system of the mobile robot 150 when the parcel cart 110 is positioned on a ground surface. Furthermore, in this exemplary embodiment, the substructure 130 includes one or more support members 137 extending between the first leg 132 and the second leg 134 (shown in FIGS. 7A and 7B).

Referring still to FIGS. 5, 6A-6B, and 7A-7B, to facilitate manual repositioning of the parcel cart 110, each leg 132, 134 of the substructure 130 preferably includes one or more wheels (or casters) 133a, 133b, 133c, 135a, 135b 135c. In this exemplary embodiment, the substructure 130 includes a first set of wheels 133a, 133b, 133c connected to the first horizontal support 132c of the first leg 132 and a second set of wheels 135a, 135b, 135c connected to the first horizontal support 134c of the second leg 134. To maintain the positioning of the parcel cart 10 and prevent undesired movement thereof, one or more of the wheels 133a, 133b, 133c, 135a, 135b, 135c may be provided with a locking mechanism 133d, 135d that can be selectively engaged to prevent rotation of the wheel 133a, 133b, 133c, 135a, 135b, 135c. In this exemplary embodiment, a single wheel 133b within the first set of wheels 133a, 133b, 133c is provided with a locking mechanism 133d, and a single wheel 135b within the second set of wheels 135a, 135b, 135c is provided with a locking mechanism 135d.

Figure 6A:
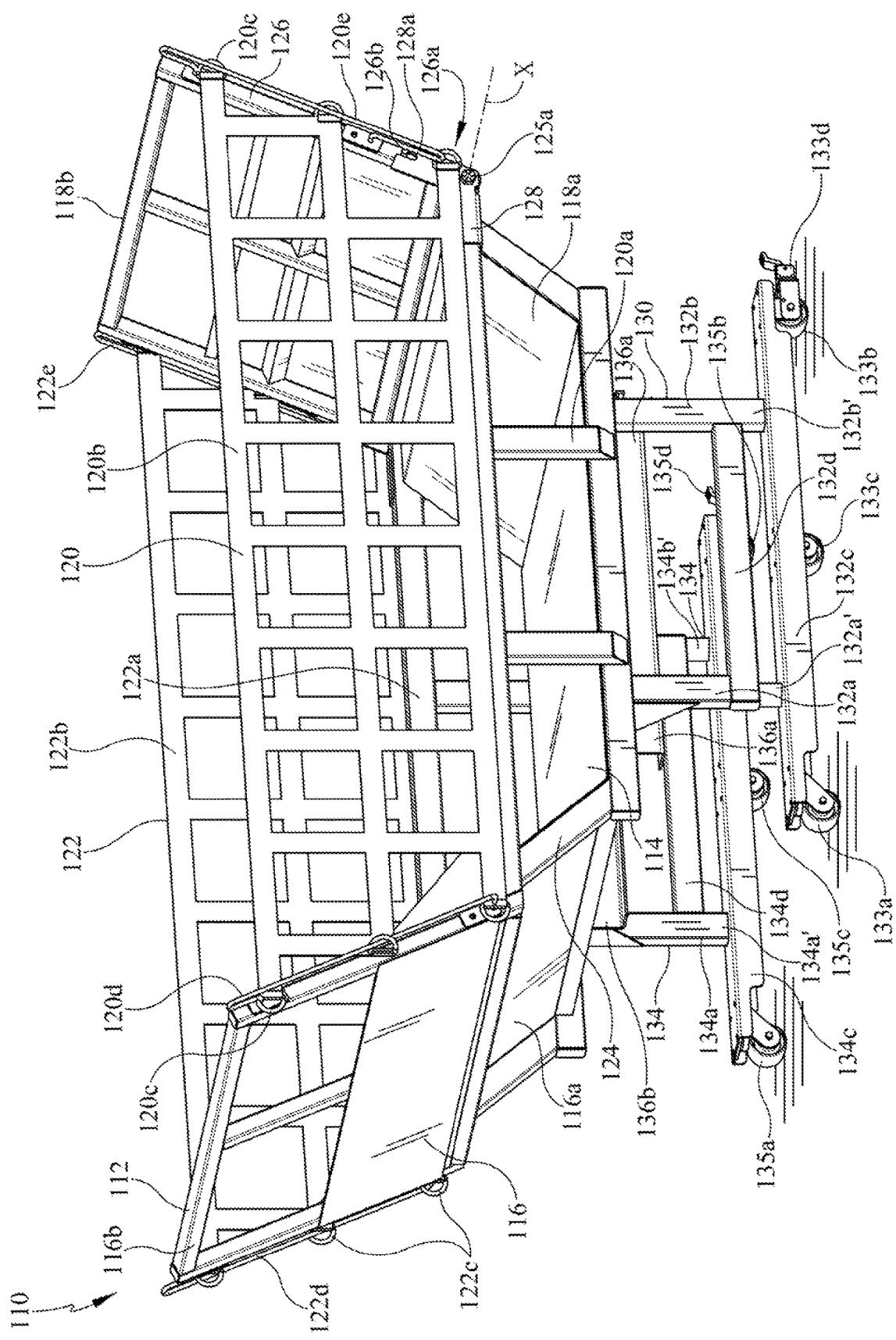
FIG. 6A is a perspective view of the exemplary parcel cart of FIG. 5.
Figure 6B:
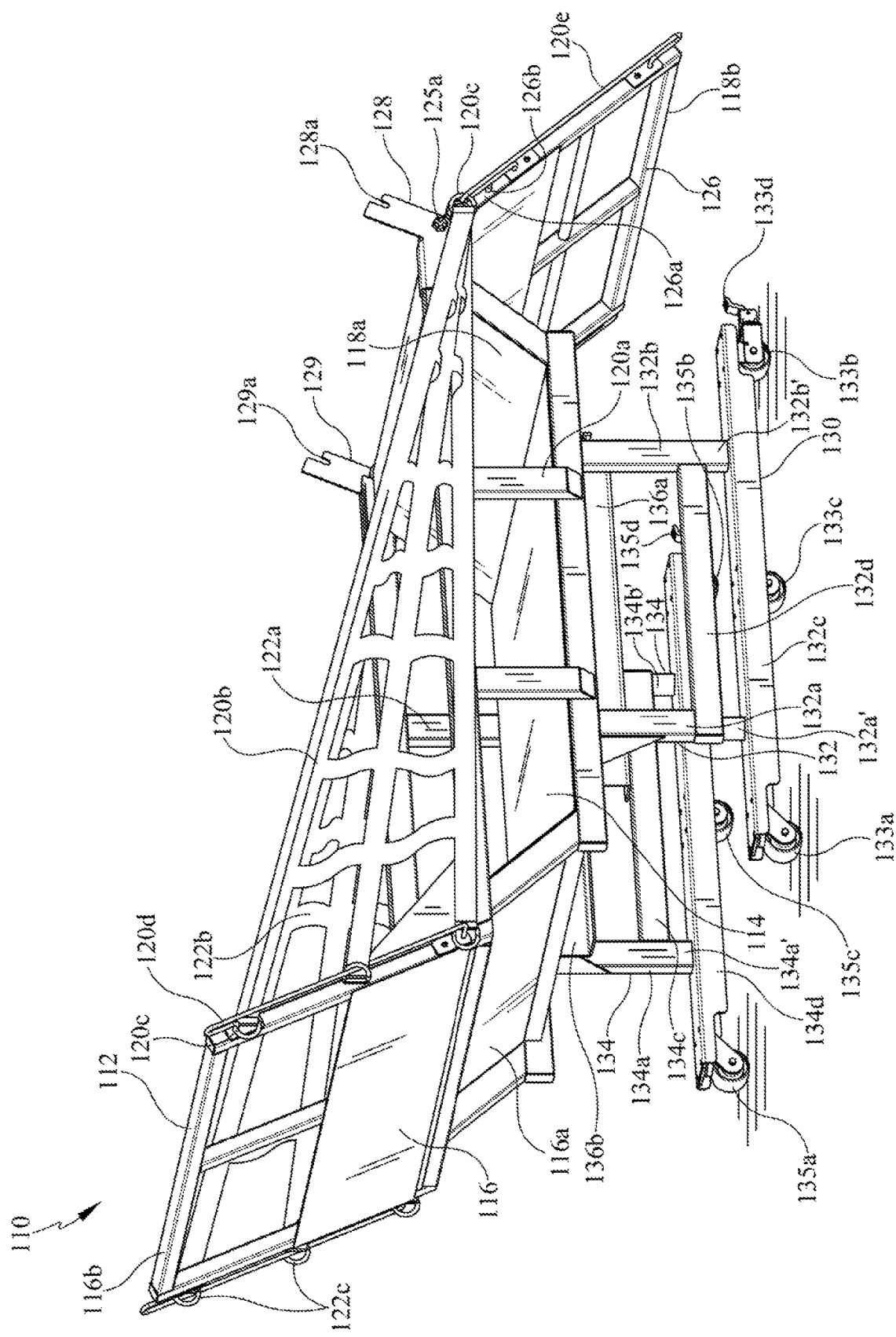
FIG. 6B is another perspective view of the exemplary parcel cart of FIG. 5, similar to that of FIG. 6A, but with one of the end walls in a lowered position.

Referring still to FIGS. 5, 6A-6B, and 7A-7B, to facilitate loading or unloading of the parcel cart 110, at least one end wall 116, 118 (or at least a portion thereof) is configured to transition between an upright position (as shown in FIGS. 5, 6A, and 7A-7B) and a lowered position (as shown in FIG. 6B). In this exemplary embodiment, an upper portion 118b of the second end wall 118 is configured to transition between the upright position and the lowered position. In this regard, the frame 112 can alternatively be characterized as including: a basket portion 124; and a gate 126 that is mounted for rotation with respect to the basket portion 124 about a substantially horizontal axis, X. Thus, the basket portion 124 is defined by the base 114, the first end wall 116, a lower portion 118a of the second end wall 118, the first side wall 120, and the second side wall 122. The gate 126 is thus the upper portion 118b of the second end wall 118 in the description of the exemplary embodiment that follows. In other words, a portion of the basket portion 124 (i.e., the lower portion 118a of the second end wall 118) and the gate 126 (i.e., the upper portion 118b of the second end wall 118) collectively define the second end wall 118.

As best shown in FIGS. 6A-6B, in this exemplary embodiment, when the gate 126 is lowered, thus placing the second end wall 118 in the lowered position (as shown in FIG. 6B), the height of the second end wall 118 is reduced from that exhibited by the second end wall 118 when the gate 126 is raised and the second end wall 118 is in the upright position (as shown in FIG. 6A). Thus, by lowering the gate 126, the extent to which a parcel must be lifted for insertion into the interior of the parcel cart 110 is reduced.

Unlike the exemplary parcel cart 10 described above with reference to FIGS. 1, 2, 3A-3B, and 4A-4B, in this exemplary embodiment, the gate 126 of the parcel cart 110 is capable of rotating beyond a substantially horizontal orientation, as shown in FIG. 6B. In some embodiments, the gate 126 is mounted for rotation with respect to the basket portion 124, such that the gate 126 can be lowered to a substantially vertical orientation relative to an underlying ground surface. By lowering the gate 126 to a substantially vertical orientation, the interior of the parcel cart 110 can be positioned closer to the offloading end of a conveyor than when the gate 126 is in a substantially horizontal orientation. In this way, the parcel cart 110 of this exemplary embodiment can effectively reduce the distance in which a parcel offloaded from the conveyor must travel before reaching the internal volume defined by the frame 112. Of course, the parcel cart 110 is also suitable for use in automated or manual loading or offloading applications.

Referring now to FIGS. 5, 6A-6B, and 7A-7B, the gate 126 is mounted for rotation with respect to the basket portion 124 of the frame 112 by a first pin 125a and a second pin 125b, which are aligned along the substantially horizontal axis, X. Of course, alternative fastening means suitable for mounting the gate 126 to the basket portion 124 and permitting rotation thereof about the axis, X, may be used without altering the operating principle.

Referring still to FIGS. 5, 6A-6B, and 7A-7B, in this exemplary embodiment, the first end wall 116 and the second end wall 118 are each comprised, respectively, of an enclosed lower portion 116a, 118a and a partially enclosed upper portion 116b, 118b. The lower portion 116a, 118a of each respective end wall 116, 118 is defined by a rigid (metal) panel attached to and extending from the first side wall 120 to the second side wall 122. The upper portion 116b, 118b of each respective end wall 116, 118 is defined, respectively, in part, by a series of rigid (metal) vertical supports interconnected by a series of rigid (metal) horizontal supports. The upper portion 116b, 118b of each respective end wall 116, 118 is further defined by a rigid (metal) panel attached to the series of vertical supports and horizontal supports, such that approximately half of the upper portion 116b, 118b of each respective end wall 116, 118 is enclosed. The arrangement or number of the vertical supports, horizontal supports, and panels defining the upper portion 116b, 118b of each respective end wall 116, 118 can, of course, be adjusted at the time of manufacture to accommodate the needs of a particular application.

Referring still to FIGS. 5, 6A-6B, and 7A-7B, in this exemplary embodiment, the first side wall 120 and the second side wall 122 are each comprised, respectively, of a lower portion 120a, 122a and an upper portion 120b, 122b. The lower portion 120a, 122a of each side wall 120, 122 is defined, respectively, by a series of rigid (metal) vertical supports interconnected by a single rigid (metal) horizontal support. The vertical supports and horizontal support defining the respective lower portions 120a, 122a of the first and second side walls 120, 122 are combined in a manner which causes the lower portion 120a, 122a of both the first side wall 120 and the second side wall 122 to define a plurality of openings. Preferably, the openings defined by the lower portion 120a, 122a of the first side wall 120 and the second side wall 122 are such that parcels loaded into the parcel cart 110 cannot pass entirely therethrough. In this regard, the arrangement or number of vertical and horizontal supports defining the lower portion 120a, 122a of the first side wall 120 and the second side wall 122 can be adjusted at the time of manufacture so that such openings are of suitable dimension for an intended application. In alternative embodiments, the respective lower portions 120a, 122a of the first side wall 120 and the second side wall 122 may each be enclosed so that no openings are defined therethrough.

Referring still to FIGS. 5, 6A-6B, and 7A-7B, in this exemplary embodiment, the upper portion 120b of the first side wall 120 and the upper portion 122b of the second side wall 122 are both comprised of a netting, such as a polyester or nylon net. The netting of the upper portion 120b of the first side wall 120 is attached to the first end wall 116 and the upper portion 118b of the second end wall 118 via a first plurality of connectors 120c. Similarly, the netting of the upper portion 122b of the second side wall 122 is attached to the first end wall 116 and the upper portion 118b of the second end wall 118 via a second plurality of connectors 122c. In this exemplary embodiment, the first plurality and second plurality of connectors 120c, 122c are each comprised of multiple rings integrated into the edge of the netting to which they correspond; of course, other fasteners suitable for connecting the netting to the respective first and second end walls 116, 118 may be used.

As a further refinement, the upper portion 120b, 122b of each side wall 120, 122 can be selectively attached or detached to the first end wall 116 and the upper portion 118b of the second end wall 118 to adjust the height of the side wall 120, 122. When the upper portion 120b, 122b of each side wall 120, 122 is detached, each side wall 120, 122 exhibits a first height which reduces the extent to which a parcel must be lifted for insertion into the interior of the parcel cart 110. Conversely, when the upper portion 120b, 122b of each side wall 120, 122 is attached, each side wall 120, 122 exhibits a second height that is greater than the first height which serves to ensure parcels do not spill over the top of the side walls 120, 122 during transport of the parcel cart 110.

Referring still to FIGS. 5, 6A-6B, and 7A-7B, to reduce the time required to adjust the height of the first side wall 120 and the second side wall 122, in this exemplary embodiment, each of the first and second end walls 116, 118 has a pair of guide rods 120d, 120e, 122d, 122e attached thereto to which the connectors 120c, 122c associated with the first side wall 120 and the second side wall 122 can be slidably connected. Specifically, the first side wall 120 has a first guide rod 120d and a second guide rod 122d attached to its opposing sides to which the connectors 120c on one end of the first side wall 120 and the connectors 122c on one end of the second side wall 122 can, respectively, be slidably connected. Similarly, the upper portion 118b of the second end wall 118 has a third guide rod 120e and a fourth guide rod 122e attached to its opposing sides to which the connectors 120c on the opposing end of the first side wall 120 and the connectors 122c on the opposing end of the second side wall 122 can, respectively, be slidably connected. As shown best in FIG. 6B, each guide rod 120d, 120e, 122d, 122e is designed such that connectors 120c, 122c connected thereto can be repositioned along the guide rod 120d, 120e, 122d, 122e to increase or decrease the height of the side walls 120, 122 to which they correspond without having to detach the upper portion 120b, 122b of the side walls 120, 122 from the respective first and second end walls 116, 118.

Referring still to FIGS. 5, 6A-6B, and 7A-7B, after a certain volume of parcels has been loaded into the interior of the parcel cart 110, the gate 126 can be transitioned back to the upright position, thus establishing a heightened barrier which serves to prevent loaded parcels from inadvertently exiting the interior of the parcel cart 110 during transport. To ensure the gate 126 does not inadvertently fall to the lowered position during transport, the frame 112 preferably includes one or more locking mechanisms 140, 142. In this exemplary embodiment, the parcel cart 110 includes two identical locking mechanisms: a first locking mechanism 140 and a second locking mechanism 142, with each locking mechanism 140, 142 configured to hold the gate 126 in the upright position. Moreover, in this exemplary embodiment, each locking mechanism 140, 142 is comprised of a component of the basket portion 124 and a component of the gate 126 configured to associate and disassociate with one another to transition each locking mechanism 140, 142 between a locked configuration and unlocked configuration.

Referring now specifically to FIGS. 6A-6B and 7A-7B, in this exemplary embodiment, each respective locking mechanism 140, 142 includes a slot 128a, 129a defined by the basket portion 124 and a locking arm 126b, 126c extending outwardly from the proximal end 126a of the gate 126. In this exemplary embodiment, the basket portion 124 includes a first bracket 128, which, in this exemplary embodiment, is mounted to the lower portion 120a of the first side wall 120 via one or more fasteners (e.g., bolts), and which defines the slot 128a of the first locking mechanism 140. The basket portion 124 further includes a second bracket 129, which, in this exemplary embodiment, is mounted to the lower portion 122a of the second side wall 122 via one or more fasteners (e.g., bolts), and which defines the slot 129a of the second locking mechanism 142. The locking arm 126b of the first locking mechanism 140 and the locking arm 126c of the second locking mechanism 142 are, respectively, oriented substantially parallel to the first pin 125a and the second pin 125b about which the gate 126 rotates.

Referring still to FIGS. 5, 6A-6B, and 7A-7B, the gate 126 can be maintained in the upright position by placing each locking mechanism 140, 142 in the locked configuration. To place each locking mechanism 140, 142 in the locked configuration, the locking arm 126b, 126c of each locking mechanism 140, 142 is lowered into a seated position within the corresponding slot 128a, 129a to which it corresponds. Conversely, to transition the gate 126 to the lowered position, each locking mechanism 140, 142 must be transitioned to the unlocked configuration, which is achieved by lifting the gate 126 so that the locking arm 126b, 126c of each locking mechanism 140, 142 is no longer positioned within the slot 128a, 129a to which it corresponds. Like the parcel cart 10 described above with reference to FIGS. 1, 2, 3A-3B, and 4A-4B, the gate 126 in this exemplary embodiment is also mounted to the basket portion 124, such that the gate 126 can be moved in a radial direction relative to the axis, X, about which it is configured to rotate to transition each locking mechanism 140, 142 between the locked and the unlocked configuration. Accordingly, the proximal end 126a of the gate 126 in this exemplary embodiment includes the same features of, and is oriented and configured to move in relation to the first and second pins 125a, 125b which mount the gate 126 to the basket portion 124 in the same manner as, the proximal end 26a of the gate 26 of the parcel cart 10 described above with reference to FIGS. 1, 2, 3A-3B, and 4A-4B.

Figure 7B:
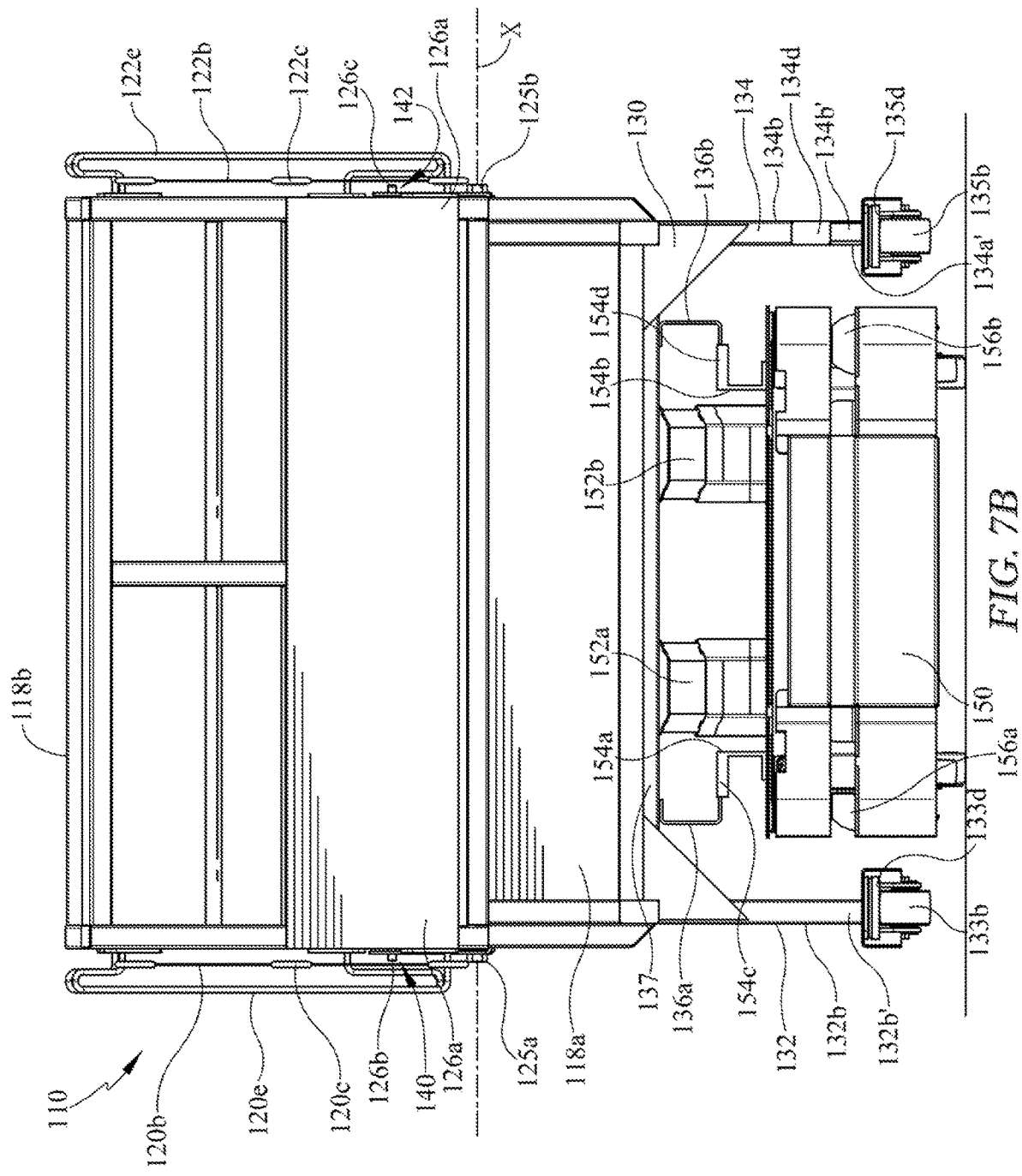
FIG. 7B is an end view of the exemplary parcel cart of FIG. 6A, similar to that of FIG. 7A, but with the mobile robot lifting the parcel cart.

Referring still to FIGS. 5, 6A-6B, and 7A-7B, the base 114 of the frame 112 and the substructure 130 of the parcel cart 110 collectively define a cavity in which a mobile robot 150 can be received. In this exemplary embodiment, the cavity is defined by the base 114, the first leg 132, the second leg 134, and the one or more support members 137 extending between the first leg 132 and the second leg 134. As shown in FIGS. 7A-7B, once the mobile robot 150 is positioned within the cavity, the first jack 152a and the second jack 152b can be simultaneously engaged to lift the parcel cart 110 above an underlying ground surface. As the parcel cart is lifted above the underlying ground surface, the second horizontal support 132d, 134d of each leg 132, 134 of the substructure 130 is lifted out of the field of view of the sensors 156a, 156b of the LIDAR system of the mobile robot 150.

Furthermore, depending on the extent to which the first jack 152a and the second jack 152b are configured to lift the parcel cart 110 above the underlying ground surface, one or more portions of each leg 132, 134 located below the second horizontal support 132d, 134d may still fall within the field of view of the sensors 156a, 156b of the LIDAR system of the mobile robot 150. To reduce the extent in which the field of view of the sensors 156a, 156b are occluded by such portions of each leg 132, 134, the first leg 132 and the second leg 134 are each preferably positioned below the frame 112, such that, when the mobile robot 150 is centrally positioned below the parcel cart 110, neither the first leg 132 nor the second leg 134 is positioned adjacent to the front or back end of the mobile robot. In other words, the first leg 132 and the second leg 134 are each positioned adjacent to a mid-portion of the mobile robot 150).

Additionally, in this exemplary embodiment, it is possible that a lower portion 132a', 132b', 134a', 134b' of the first vertical support 132a, 134a and the second vertical support 132b, 134b of each leg 132, 134 located between the first horizontal support 132c, 134c and the second horizontal support 132d, 134d may fall within the field of view of one of the sensors 156a, 156b when the parcel cart 10 is lifted. Accordingly, in this exemplary embodiment, the lower portions 132a', 134b' of the vertical supports 132a, 134b are shaped to minimize the extent to which such lower portions 132a', 134b' occlude the sensors 156a, 156b of the LIDAR system. Specifically, since the lower portions 132a', 134b' of the vertical support 132a, 134b are positioned proximate to the sensors 156a, 156b, these lower portions 132a', 134b' are constructed of a thin plate rotated toward the cavity defined by the substructure 130 and frame 112 of the parcel cart 110. At the same time, the lower portions 132b', 134a' of each of the vertical supports 132b, 134a positioned distal from the sensors 156a, 156b are of the same tubular construction as the remaining portion of the vertical supports 132b, 134a. Because of their distance away from the respective sensors 156a, 156b, the shape of the lower portions 132b', 134a' of the vertical supports 132b, 134a is not as critical.

With the parcel cart 110 lifted and the sensors 156a, 156b of the LIDAR system either unobstructed or minimally obstructed, the LIDAR system of the mobile robot 150 can thus effectively assist in navigating the mobile robot 150, and thus the parcel cart 110, to the intended destination.

To ensure the mobile robot 150 is centrally positioned below the parcel cart 110 before engaging the first jack 152a and the second jack 154b to lift the parcel cart 110, the parcel cart 110 further includes one or more alignment members, which are configured to interact with the mobile robot 150 and guide it to a substantially centered position below the parcel cart 110. In this exemplary embodiment, the parcel cart includes: a first guide rail 136a configured to interact with a first alignment arm 154a protruding from an upper surface of the mobile robot 150; and a second guide rail 136b configured to interact with a second alignment arm 154b protruding upwardly from an upper surface of the mobile robot 150. The first guide rail 136a and the second guide rail 136b are positioned, such that, when the mobile robot 150 approaches the center of the cavity, the first alignment arm 154a and the second alignment arm 154b of the mobile robot 150 are able to move alongside the first guide rail 136a and the second guide rail 136b, respectively, thus permitting entry of the mobile robot 150 into the cavity. Conversely, if the mobile robot 150 is too far off-center when approaching the cavity, the ends of the first guide rail 136*a* and the first alignment arm 154*a* or the ends of the second guide rail 136*b* and the second alignment arm 154*b* will contact each other, thus preventing entry of the mobile robot 150 into the cavity. In this exemplary embodiment, the guide rails 136*a*, 136*b* are connected to and extend downwardly from the one or more support members 137 extending between the first leg 132 and the second leg 134.

Referring now to FIGS. 7A-7B, as the first jack 152*a* and the second jack 152*b* lift the parcel cart 110 above an underlying ground surface, the first guide rail 136*a* and the second guide rail 136*b* are drawn closer to the first alignment arm 154*a* and the second alignment arm 154*b*, respectively, until the guide rails 136*a*, 136*b* and alignment arms 154*a*, 154*b* are urged against one another, as shown in FIG. 7B. In this exemplary embodiment, each alignment arm 154*a*, 154*b* of the mobile robot 150 is longer than the length of the guide rail 136*a*, 136*b* to which it corresponds and includes an end plate 154*c*, 154*d* on each of its ends. Accordingly, when the first guide rail 136*a* and the second guide rail 136*b* are urged against the first alignment arm 154*a* and the second alignment arm 154*b*, respectively, each guide rail 136*a*, 136*b* is effectively seated between the end plates 154*c*, 154*d* of the alignment arm 154*a*, 54*b* to which it corresponds. Accordingly, in instances where the mobile robot 150 brakes abruptly while transporting the parcel cart, the guide rails 136*a*, 136*b* of the parcel cart 110 are prevented from sliding past the end plates 154*c*, 154*d* of the alignment arms 154*a*, 154*b*. In this way, the guide rails 136*a*, 136*b* of the parcel cart 110 can serve to interlock the parcel cart 110 and the mobile robot 150 to prevent the two from disassociating from one another during transport of the parcel cart 110.

To assist the mobile robot 150 in transporting the parcel cart 110 to the intended destination, the mobile robot 150 may include one or more stereovision cameras (not shown), which provide feedback regarding the presence of obstacles within the path of the mobile robot 150. Stereovision cameras employed for such application can have a field of view which extends from the ground surface on which the mobile robot 150 is positioned to several feet above the ground surface. To accommodate such field of view and reduce or eliminate the extent to which one or more of the stereovision cameras associated with the mobile robot 150 is occluded by the parcel cart 110, at least one of the end walls 116, 118 of the frame 112 extends upwardly at an angle relative to the base 114 (i.e., at least one of the end walls 116, 118 is in a non-perpendicular orientation relative to the base 114 of the frame 112). In this exemplary embodiment, the first end wall 116 and the second end wall 118 each extend upwardly from the base 114 at an angle, such that the first end wall 116 and the second end wall 118 are not perpendicular to the base 114. Such orientation of the second end wall 118 thus prevents or reduces the occlusion of any stereovision camera associated with the mobile robot 150 having a field of view proximal to either the first end wall 116 or the second end wall 118. In this way, the angled orientation of the first end wall 116 and the second end wall 118 relative to the base 114 may serve to improve the navigation and collision detection capabilities of the mobile robot 150 while transporting the parcel cart 110.

One of ordinary skill in the art will recognize that additional embodiments are also possible without departing from the teachings of the present invention. This detailed description, and particularly the specific details of the embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A parcel cart, comprising:
    a substructure; and
    a frame mounted to and supported by the substructure, the frame defining an internal volume in which parcels are received and stored for transport, and the frame including
        a base,
        a first end wall extending upwardly from the base, and
        a second end wall extending upwardly from the base, the second end wall being configured to transition between an upright position and a lowered position to facilitate loading or unloading of the parcel cart,
        a first side wall extending between the first end wall and the second end wall, and
        a second side wall extending between the first end wall and the second end wall;
    wherein the substructure is mounted to a portion of the base located between the first end wall and the second end wall.

2. The parcel cart as recited in claim 1, wherein the substructure and the frame collectively define a cavity for receiving a mobile robot.

3. The parcel cart as recited in claim 1, wherein the frame is characterized as including a basket portion and a gate that is mounted for rotation with respect to the basket portion about a substantially horizontal axis, the gate at least partially defining the second end wall, such that the gate can rotate about the substantially horizontal axis to transition the second end wall between the upright position and the lowered position.

4. The parcel cart as recited in claim 3, wherein an upper surface of the gate includes a roller deck.

5. The parcel cart as recited in claim 3, wherein the gate is mounted to the basket portion, such that the gate can be moved in a radial direction relative to the substantially horizontal axis.

6. The parcel cart as recited in claim 5, wherein the gate includes a proximal end defining an elongated slot configured to receive a pin, which defines the substantially horizontal axis about which the gate rotates.

7. The parcel cart as recited in claim 5, wherein the gate includes a locking arm, and wherein the basket portion defines a slot configured to receive the locking arm to maintain the second end wall in the upright position.

8. The parcel cart as recited in claim 3, wherein the basket portion includes a plate positioned below the gate and configured to limit rotation of the gate about the substantially horizontal axis.

9. The parcel cart as recited in claim 8, wherein the plate is configured to limit rotation of the gate about the substantially horizontal axis, such that, when the second end wall is in the lowered position, the gate is in a substantially horizontal orientation.

10. The parcel cart as recited in claim 1, wherein at least one of the first end wall and the second end wall is in a non-perpendicular orientation relative to the base.

11. A parcel cart, comprising:
    a substructure; and a frame mounted to and supported by the substructure, the frame defining an internal volume in which parcels are received and stored for transport, and the frame including
a base,
a first end wall extending upwardly from the base, and
a second end wall extending upwardly from the base, the second end wall being configured to transition between an upright position and a lowered position to facilitate loading or unloading of the parcel cart,
a first side wall extending between the first end wall and the second end wall, and
a second side wall extending between the first end wall and the second end wall;
wherein the first side wall is comprised of a first netting removably and slidably connected to the first end wall and the second end wall, such that a height of the first side wall can be adjusted by selectively connecting or sliding the first netting along one or both of the first end wall and the second end wall.

12. The parcel cart as recited in claim 11, wherein the second side wall is comprised of a second netting removably and slidably connected to the first end wall and the second end wall, such that a height of the second side wall can be adjusted by selectively connecting or sliding the second netting along one or both of the first end wall and the second end wall.

13. A parcel cart, comprising:
a substructure; and
a frame mounted to and supported by the substructure, the frame defining an internal volume in which parcels are received and stored for transport, and the frame including
a base,
a first end wall extending upwardly from the base, and
a second end wall extending upwardly from the base,
a first side wall extending between the first end wall and the second end wall, and
a second side wall extending between the first end wall and the second end wall,
wherein at least one of the first end wall and the second end wall is in a non-perpendicular orientation relative to the base;
wherein the substructure is mounted to a portion of the base located between the first end wall and the second end wall.

14. The parcel cart as recited in claim 13, wherein the substructure and the frame collectively define a cavity for receiving a mobile robot.

15. The parcel cart as recited in claim 13, wherein the first end wall and the second end wall are each in a non-perpendicular orientation relative to the base.

16. The parcel cart as recited in claim 13, wherein the second end wall is configured to transition between an upright position and a lowered position to facilitate loading or unloading of the parcel cart.

17. The parcel cart as recited in claim 16, wherein the frame is characterized as including a basket portion and a gate that is mounted for rotation with respect to the basket portion about a substantially horizontal axis, the gate at least partially defining the second end wall, such that the gate can rotate about the substantially horizontal axis to transition the second end wall between the upright position and the lowered position.

18. The parcel cart as recited in claim 17, wherein the gate is mounted to the basket portion, such that the gate can be moved in a radial direction relative to the substantially horizontal axis.

19. The parcel cart as recited in claim 17, wherein an upper surface of the gate includes a roller deck.

20. A parcel cart, comprising:
a substructure; and
a frame mounted to and supported by the substructure, the frame defining an internal volume in which parcels are received and stored for transport, and the frame including
a base,
a first end wall extending upwardly from the base, and
a second end wall extending upwardly from the base, the second end wall being configured to transition between an upright position and a lowered position to facilitate loading or unloading of the parcel cart,
a first side wall extending between the first end wall and the second end wall, and
a second side wall extending between the first end wall and the second end wall;
wherein the frame is characterized as including a basket portion and a gate that is mounted for rotation with respect to the basket portion about a substantially horizontal axis to transition the second wall between the upright position and the lowered position, the basket portion defining a fixed lower portion of the second end wall and the gate defining an upper portion of the second end wall;
wherein an upper surface of the gate includes a roller deck.

* * * * *